United States Patent
Comsa et al.

(10) Patent No.: US 9,591,499 B2
(45) Date of Patent: Mar. 7, 2017

(54) WTRU MEASUREMENTS HANDLING TO MITIGATE IN-DEVICE INTERFERENCE

(75) Inventors: Virgil Comsa, Montreal (CA); Diana Pani, Montreal (CA); Paul Marinier, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 1111 days.

(21) Appl. No.: 13/289,984

(22) Filed: Nov. 4, 2011

(65) Prior Publication Data

US 2012/0281563 A1 Nov. 8, 2012

Related U.S. Application Data

(60) Provisional application No. 61/410,589, filed on Nov. 5, 2010, provisional application No. 61/441,808, filed on Feb. 11, 2011.

(51) Int. Cl.
*H04W 4/00* (2009.01)
*H04W 24/10* (2009.01)
(Continued)

(52) U.S. Cl.
CPC .......... *H04W 24/10* (2013.01); *H04L 1/0026* (2013.01); *H04W 16/14* (2013.01);
(Continued)

(58) Field of Classification Search
CPC .......................... H04W 24/00; H04W 72/1215
(Continued)

(56) References Cited

U.S. PATENT DOCUMENTS 6,044,270 A * 3/2000 Raith ................ H04W 36/0088
455/434
8,340,580 B1 * 12/2012 Epstein ................ H04B 1/1027
455/114.2
(Continued)

FOREIGN PATENT DOCUMENTS

EP 2048898 A1 4/2009

OTHER PUBLICATIONS

3rd Generation Partnership Project (3GPP), R2-105361, "Further analysis on in-device coexistence interference avoidance solutions", ZTE, 3GPP TSG-RAN WG2 Meeting #71bis, Xi'an, China, Oct. 11-15, 2010, 8 pages.

(Continued)

*Primary Examiner* — Farah Faroul
(74) *Attorney, Agent, or Firm* — Condo Roccia Koptiw LLP

(57) ABSTRACT

A method for performing measurements in a device with at least two radio access technologies (RATs) is disclosed. The method may include establishing a first measurement schedule on a first RAT, and establishing a first transmission schedule for a second RAT. The method may further include changing at least one of the first measurement schedule or the first transmission schedule to prevent measurements of the first measurement schedule from occurring contemporaneously with transmissions of the first transmission schedule. Transmissions from the second RAT may interfere with measurements on the first RAT. The method may include transitioning from the first measurement mode to a second measurement mode based on determining the second RAT is operating on potentially interfering frequency.

16 Claims, 9 Drawing Sheets

(51) Int. Cl.
    *H04L 1/00*     (2006.01)
    *H04W 72/08*     (2009.01)
    *H04W 16/14*     (2009.01)
    *H04W 72/12*     (2009.01)
    *H04W 88/06*     (2009.01)

(52) U.S. Cl.
    CPC ........ *H04W 72/082* (2013.01); *H04W 72/085* (2013.01); *H04W 72/1215* (2013.01); *H04W 88/06* (2013.01)

(58) Field of Classification Search
    USPC ..................................... 370/336, 345, 395.4
    See application file for complete search history.

(56) References Cited

U.S. PATENT DOCUMENTS

| | | | | |
|---|---|---|---|---|
| 2005/0250510 | A1* | 11/2005 | Kaikkonen | H04W 48/16 455/452.2 |
| 2007/0042784 | A1* | 2/2007 | Anderson | H04W 52/34 455/450 |
| 2008/0189970 | A1* | 8/2008 | Wang | H04W 36/0055 33/701 |
| 2009/0309780 | A1* | 12/2009 | Albert | G01S 13/876 342/47 |
| 2011/0053539 | A1* | 3/2011 | Sundstrom | H04W 24/08 455/226.1 |
| 2012/0069766 | A1* | 3/2012 | Fu | H04B 1/406 370/252 |
| 2013/0223391 | A1* | 8/2013 | Koo | H04W 72/0406 370/329 |
| 2013/0242919 | A1* | 9/2013 | Koo | H04W 72/082 370/329 |
| 2014/0031036 | A1* | 1/2014 | Koo | H04W 36/14 455/434 |
| 2014/0112180 | A1* | 4/2014 | Axmon | H04W 24/10 370/252 |
| 2014/0213210 | A1* | 7/2014 | Li et al. | 455/296 |
| 2014/0226623 | A1* | 8/2014 | Seo et al. | 370/331 |
| 2014/0369187 | A1* | 12/2014 | Sang | H04L 47/14 370/229 |
| 2015/0016387 | A1* | 1/2015 | Elmdahl et al. | 370/329 |
| 2015/0031369 | A1* | 1/2015 | Gunnarsson et al. | 455/438 |
| 2015/0036580 | A1* | 2/2015 | Siomina et al. | 370/312 |
| 2015/0080008 | A1* | 3/2015 | Ngai et al. | 455/452.2 |

OTHER PUBLICATIONS

3rd Generation Partnership Project (3GPP), R2-105572, "Possible TDM Solution for LTE, WiFi and BT In-device Coexistence", Samsung, 3GPP TSG-RAN WG2 #71bis, Xian, China, Oct. 11-15, 2010, 5 pages.

3rd Generation Partnership Project (3GPP), R2-105587, "Consideration on the details of in-device interference", Huawei, HiSilicon, 3GPP TSG-RAN WG2 Meeting #71bis, Xian, China, Oct. 11-15, 2010, 4 pages.

3rd Generation Partnership Project (3GPP), R2-105764, "Types of TDM Solutions for LTE ISM Coexistence", Qualcomm Incorporated, 3GPP TSG-RAN WG2 Meeting #71-BIS, Xian, China, Oct. 11-15, 2010, 7 pages.

3rd Generation Partnership Project (3GPP), R2-103495, "LS on in-device coexistence interference", 3GPP Release 10, 3GPP TSG-RAN WG2 Meeting #70bis, Stockholm, Sweden, Jun. 28-Jul. 2, 2010, 2 pages.

3rd Generation Partnership Project (3GPP), 3GPP TS 36.133 V9.5.0, "$3^{rd}$ Generation Partnership Project; Technical Specification Group Radio Access Network; Evolved Universal Terrestrial Radio Access (E-UTRA); Requirements for support of radio resource management (Release 9)", Oct. 2010, 379 pages.

\* cited by examiner

WTRU MEASUREMENTS HANDLING TO MITIGATE IN-DEVICE INTERFERENCE

CROSS REFERENCE TO RELATED APPLICATIONS

This application claims the benefit of U.S. Provisional Patent Application No. 61/410,589 filed Nov. 5, 2010 and U.S. Provisional Patent Application No. 61/441,808 filed Feb. 11, 2011, the contents of which are hereby incorporated by reference herein.

BACKGROUND

The current market of wireless smart devices supporting multiple radio technologies is growing quickly. Additionally, the spectrum allocation for the Third Generation Partnership Project (3GPP) Long Term Evolution (LTE) in different world regions may overlap with the spectrum band for other radio access technologies. In these scenarios, mutual interference problems may lead to the degradation of channel quality and may potentially cause LTE compliant devices to function inefficiently. One of the currently recognized problems is the LTE and unlicensed Industrial, Scientific and Medical (ISM) technologies are being deployed in adjacent bands in many jurisdictions. For example, ISM may be deployed in the 2.4 GHz short-range radio frequency band. Some studies regarding the coexistence of Bluetooth and/or WLAN (Wi-Fi) operating in 2.4-2.5 GHz and LTE TDD band 40 (e.g., 2300-2400 MHz) indicate that the actual state-of-the-art filter technology may be unable to provide sufficient rejection on the adjacent frequencies. Thus, a mutual interference between ISM and LTE transceivers may occur, which may cause receiver saturation and eventually radio link failures. Previous solutions do not adequately address the problems in an increasingly crowded licensed spectrum.

SUMMARY

Methods for altering measurement times to account for interference are disclosed. For example, the measurements may support the operation of LTE networks. An example method may include establishing a first measurement mode for a first radio access technology (RAT). The first measurement mode may be associated with a first measurement schedule and the first RAT. The first RAT may operate at a first frequency. The method may include determining that a second RAT is operating on a second frequency. Transmissions on the second frequency may interfere with measurements on the first frequency. The method may include transitioning from the first measurement mode to a second measurement mode based determining the second RAT is operating on the second frequency. The second measurement mode may be associated with a second measurement schedule.

The measurements on the first frequency may include at least one of channel quality measurements, radio link monitoring measurements, radio resource monitoring measurements, or a precoding matrix indicator (PMI) measurement. The first RAT may be a long term evolution (LTE) technology and the second RAT may operate in the industrial, scientific, and medical (ISM) frequency range. The method may further include transitioning to a third measurement mode associated with a third measurement schedule based on receiving a time division multiplexing (TDM) pattern from a LTE network. The TDM pattern may establish a transmission schedule for the first and second RATs. The method may further include transitioning to another measurement mode associated with another measurement schedule based on receiving an explicit command to change measurement modes from a long term evolution (LTE) network. For example, the explicit command may be a medium access control (MAC) control element (CE) or a physical downlink control channel (PDCCH) order.

The method may further include determining the second RAT has stopped operating on the second frequency, and transitioning from the second measurement mode to the first measurement mode based determining the second RAT has stopped operating on the second frequency. For example, radio link monitoring (RLM) measurements may be performed in both of the first measurement mode and the second measurement mode. A first evaluation period for the RLM measurements may be used in the first measurement mode, which may be different than a second evaluation period for the RLM measurements in the second measurement mode. At least on of un-interfered channel state information (CSI) measurements, interfered CSI measurements, LTE-scheduled measurements, or aggressor-scheduled CSI measurements may be performed in the second measurement mode.

A Wireless Transmit/Receive Unit (WTRU) may implement one or more methods disclosed herein for managing measurement schedules. The WTRU may include at least one antenna. The WTRU may further include a transceiver configured to perform measurements based on signals received at a first frequency via the at least one antenna. The WTRU may further include an aggressor transmitter configured to transmit on a second frequency. Transmissions at the second frequency may interfere with the measurements at the first frequency. The WTRU may further include a processor configured to control timing of the measurements performed at the transceiver. The processor may be further configured to determine the timing of the measurements based on a transmission schedule of the aggressor transmitter.

The processor may be configured to send a message to an LTE network. The message may inform the LTE network of the existence activity by the aggressor transmitter. The processor may be further configured to receive a time division multiplexing pattern (TDM) from a LTE network via the transceiver. The TDM pattern may establish periods of time for operation by the transceiver and periods of time for operation of the aggressor transmitter. The processor may be configured to determine that the timing of the measurements occurs during periods of time for operation by the transceiver according to the TDM pattern received from the LTE network. The processor may be configured to determine that a first time for at least one measurement occurs during the periods of time for operation by the aggressor transmitter according to the TDM pattern received from the LTE network. The aggressor transmitter may be configured to indicate to the processor that the aggressor transmitter will be inactive during the first time.

The processor may be configured to determine the timing of the measurements based on the transmission schedule of the aggressor transmitter by being configured to determine periods of aggressor transmitter inactivity based on the transmission schedule, and determine that the timing of the measurements performed at the transceiver occur during the periods of aggressor transmitter inactivity. The processor may be configured to determine the timing of the measurements based on the transmission schedule of the aggressor transmitter by being configured to determine periods of aggressor transmitter activity based on the transmission schedule, and determine that the timing of the measurements performed at the transceiver occur during the periods of aggressor transmitter activity. The processor may be further configured to adjust at least one of a timing of or a frequency of a channel quality index (CQI) report based on the transmission schedule of the aggressor transmitter.

A method for performing measurements in a device with at least two radio access technologies (RATs) is disclosed. The method may include establishing a first measurement schedule on a first RAT, and establishing a first transmission schedule for a second RAT. The method may further include changing at least one of the first measurement schedule or the first transmission schedule to prevent measurements of the first measurement schedule from occurring contemporaneously with transmissions of the first transmission schedule. For example, changing at least one of the first measurement schedule or the first transmission schedule to prevent the measurements of the first measurement schedule from occurring contemporaneously with the transmissions of the first transmission schedule may be based on receiving a TDM pattern from an LTE network via the first RAT. In an example, changing at least one of the first measurement schedule or the first transmission schedule to prevent the measurements of the first measurement schedule from occurring contemporaneously with the transmissions of the first transmission schedule may include establishing periods of time wherein the transmissions of the first transmission schedule are prevented from occurring, and performing the measurements of the first measurement schedule during the periods of time wherein the transmissions of the first transmission schedule are prevented from occurring. In an example, changing at least one of the first measurement schedule or the first transmission schedule to prevent the measurements of the first measurement schedule from occurring contemporaneously with the transmissions of the first transmission schedule may include changing the first measurement schedule to a second measurement schedule, wherein measurements of the second measurement schedule do not occur contemporaneously with transmissions of the first transmission schedule.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1A:
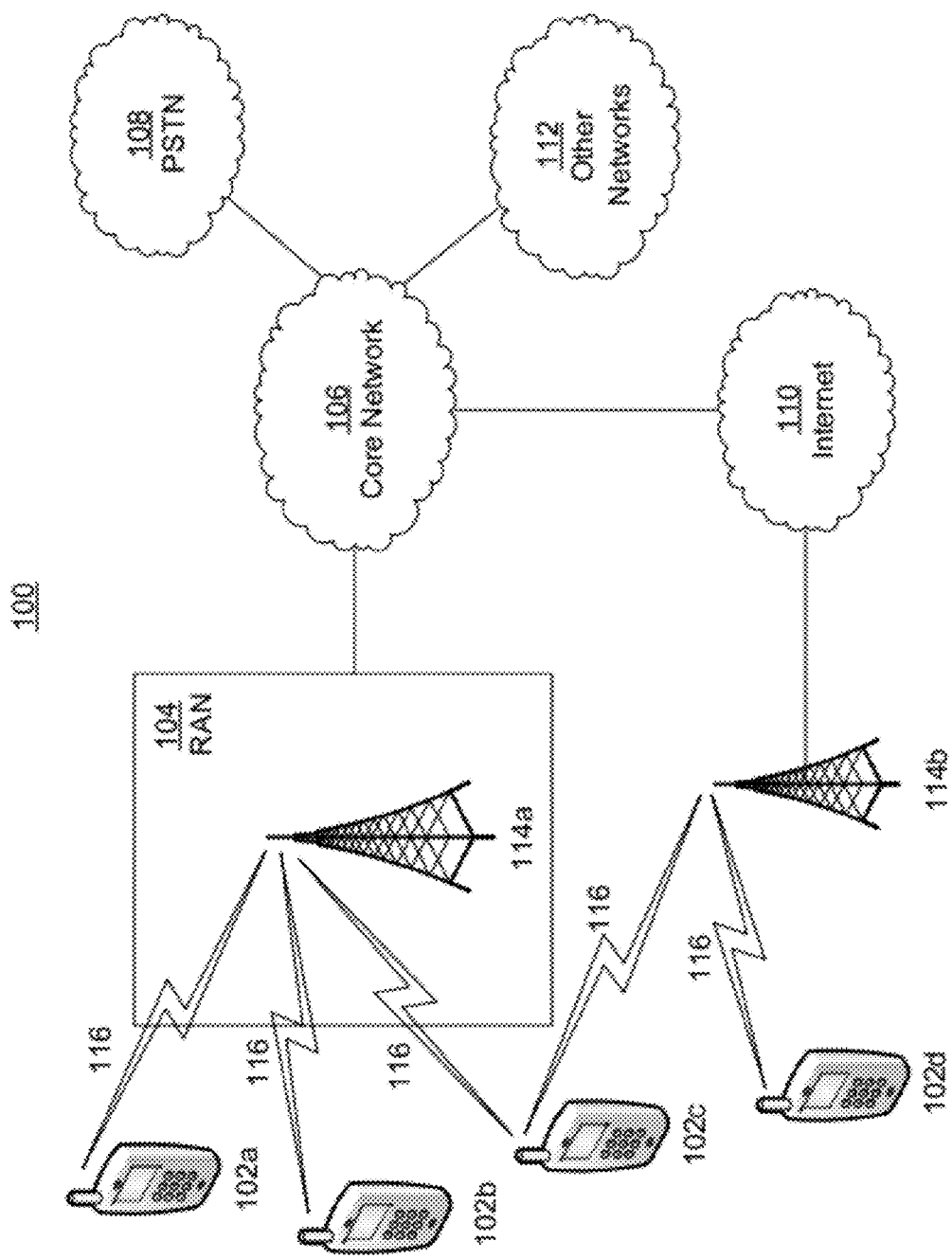
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
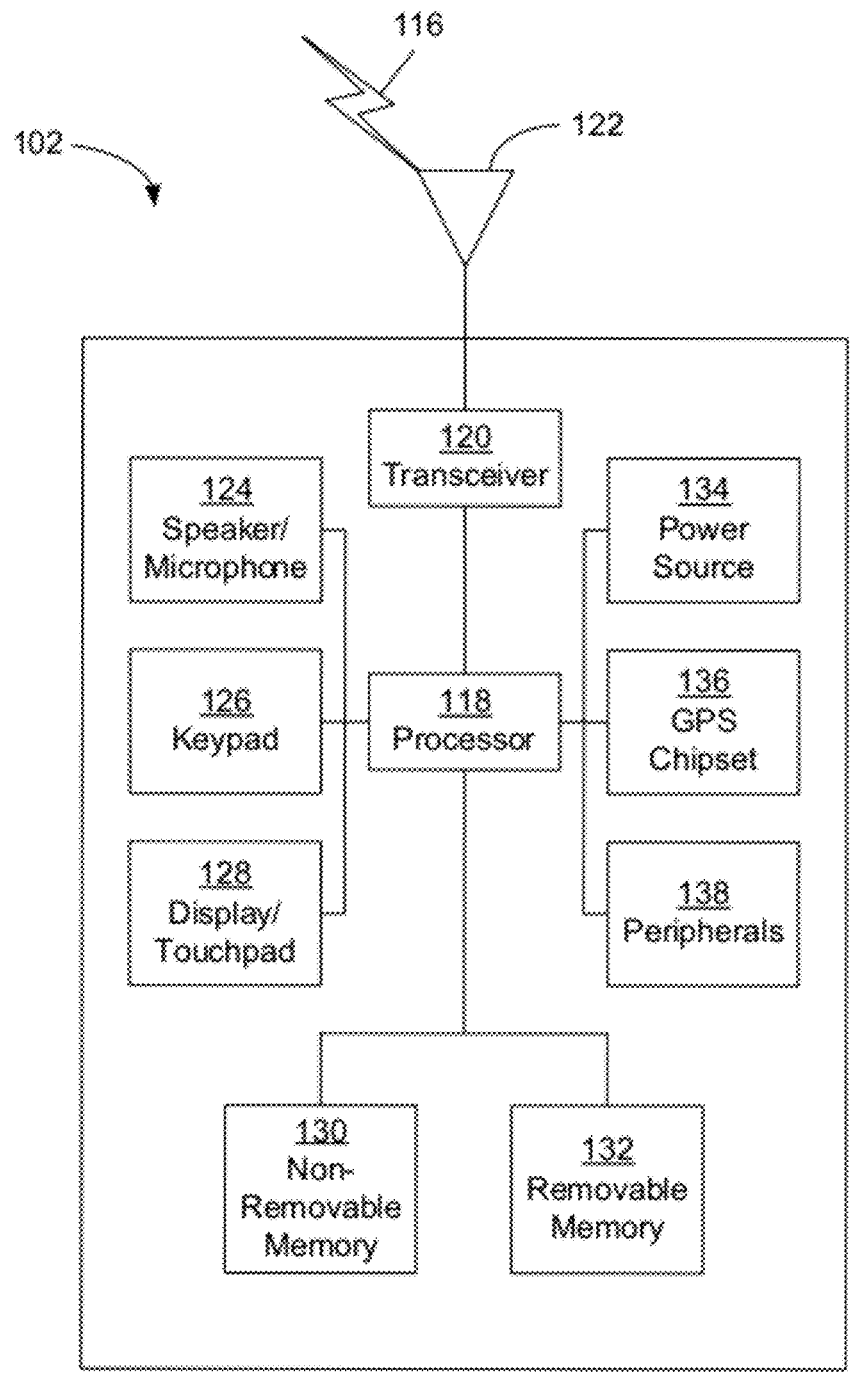
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
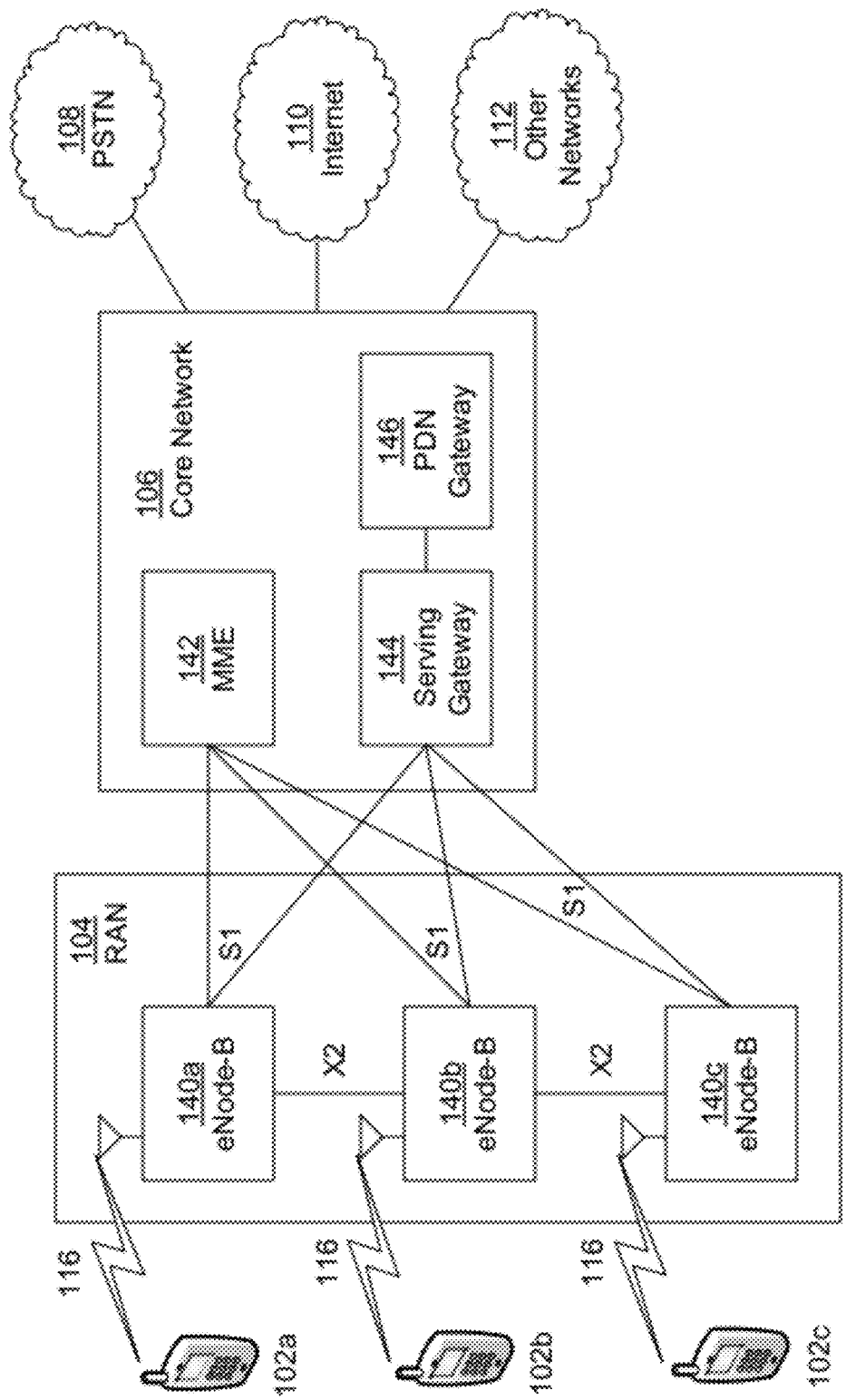
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2:
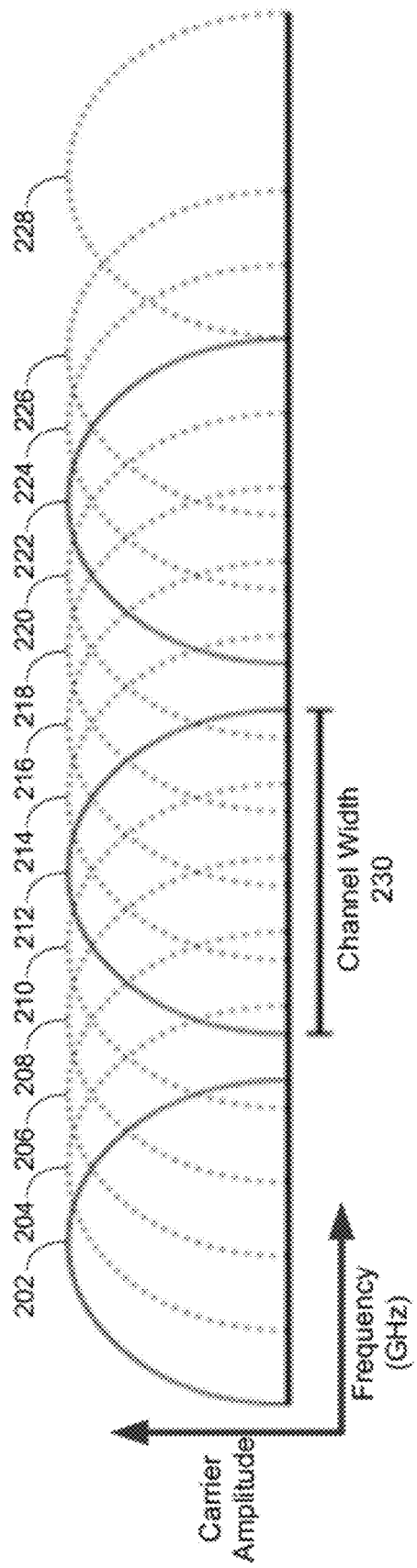
FIG. 2 illustrates an example of Wi-Fi 2.5 GHz channels, wherein each channel may be 22 MHz wide.

FIG. 2 illustrates an example frequency band for Wi-Fi radio access networks. For example, Wi-Fi may be implemented in the ISM band of the frequency spectrum, which may be in the 2.4 GHz range. Wi-Fi channels (e.g., Wi-Fi channels 202, 204, 206, . . . , 228) may overlap, and therefore Wi-Fi channel assignment for during a given operating period may be restricted to one or more channels. For example, each 5th channel may be utilized. Each channel may be associated with a center frequency. For example, Channel 202 (e.g., Wi-FI Channel 1) may have a center frequency of 2.412 GHz. Channel 204 (e.g., Wi-FI Channel 2) may have a center frequency of 2.417 GHz. Channel 206 (e.g., Wi-FI Channel 3) may have a center frequency of 2.422 GHz. Channel 208 (e.g., Wi-FI Channel 4) may have a center frequency of 2.427 GHz. Channel 210 (e.g., Wi-FI Channel 5) may have a center frequency of 2.432 GHz. Channel 212 (e.g., Wi-FI Channel 6) may have a center frequency of 2.437 GHz. Channel 214 (e.g., Wi-FI Channel 7) may have a center frequency of 2.442 GHz. Channel 216 (e.g., Wi-FI Channel 8) may have a center frequency of 2.447 GHz. Channel 218 (e.g., Wi-FI Channel 9) may have a center frequency of 2.452 GHz. Channel 220 (e.g., Wi-FI Channel 10) may have a center frequency of 2.457 GHz. Channel 222 (e.g., Wi-FI Channel 11) may have a center frequency of 2.462 GHz. Channel 224 (e.g., Wi-FI Channel 12) may have a center frequency of 2.467 GHz. Channel 226 (e.g., Wi-FI Channel 13) may have a center frequency of 2.472 GHz. Channel 228 (e.g., Wi-FI Channel 14) may have a center frequency of 2.484 GHz.

In the United States, Wi-FI operation may typically occur on channels 1, 6 and 11 (e.g., Channel 202, Channel 212, and Channel 222, respectively). As shown in FIG. 2, a typical channel width, such as channel width 230, may be 22 MHz. Channels 202, 212, and 222 (e.g., Wi-FI Channels, 1, 6, and 11) may be separated by a 5 MHz guard band. For example, the utilizing spectral mask may entail that the signal be attenuated by at least 50 dBr from its peak energy at 11 MHz from the center frequency of the channel. Bluetooth, a TDD technology currently deployed in the 2450 MHz band, may use frequency hopping spread spectrum over 79 channels of 1 MHz each in the range of 2402-2480 MHz. In 3GPP Release 10 a WTRU/eNB may implement carrier aggregation, and the LTE TDD band 40 may utilize an entire band, for example up to 100 MHz in bandwidth. In some circumstances, an operation may occur in the 2380-2400 MHz band, but not in other spectrum frequencies. In this circumstance, radio access networks for LTE operation will operate in the immediate vicinity of the ISM band. For example, the adjacent channels of the ISM transmissions may become problematic due to mutual interference with the LTE signals. In another example mutual interference problem, a GPS receiver may be relatively easily de-sensed by transmitters working in the 768 MHz frequency range due to a second harmonic component.

Radio Link Monitoring may be a physical layer measurement function that may be performed in order to determine if the radio channel is degrading, resulting in unreliable wireless communications. For example, while the WTRU is in an RRC_Connected mode state, the WTRU may measure the quality of the radio link (RL) over two defined periods of time (i.e., evaluation periods). For the periods corresponding to the evaluation periods, the WTRU will determine a value of the parameters Qout (e.g., the out-of-sync indication threshold) and/or Qin (e.g., the in-sync threshold). The RL quality estimate(s) (e.g., Qout and/or Qin) may be based on received reference symbols that are transmitted in every downlink (DL) sub-frame by the evolved Node B (eNB). For example, the reference symbols may be cell reference symbols (CRS) (e.g., also referred to as common reference symbols or signals). The WTRU may indicate to higher layers that the WTRU is out-of-sync based on the Qout threshold being met for the duration of its respective evaluation period. Similarly, the WTRU may indicate to higher layers that the WTRU is in-sync based on the Qin threshold being met for the duration of its respective evaluation period.

Measurements reporting (e.g., Signal Strength, Signal Quality and/or Channel Quality indicators), radio link failure (RLF), and Radio Link Monitoring (RLM) procedures have been designed to allow for normal operation in situations with controlled spectrum emission deployment coexistence requirements. Thus, these procedures may not be designed to address interference that may arise from a non-licensed spectrum interferer (e.g., an aggressor) that may have random or pseudo-random operational behavior when actively transmitting. As a result, the latency associated with these typical radio link procedures may assume smooth transitions in a controlled deployment that may not be true in real world conditions.

As multi-RAN devices, for example a WTRU that is configured to access an LTE network and Wi-FI networks, become increasingly common, techniques for mitigating in-device mutual interference and receiver saturation may allow for more robust communications. For example, a time division multiplexing (TDM) scheme and/or a frequency division multiplexing (FDM) scheme may be employed to address the mutual interference of two transmitters/receivers operating on adjacent bands. FDM may allow a network to handover a WTRU on a cell deployed on a secure frequency (e.g., a frequency that would not be affected by the interference caused by the other transmitter). The secure frequency may be associated with an escape carrier. Using an escape carrier may allow for uncoordinated operation between in-device radio technologies without interfering with each other. When used herein, the term LTE network may refer to the LTE RAN (e.g., eNB) and/or the LTE core network (e.g., MME, Serving Gateway, PDN Gateway, etc.), or some combination thereof.

However, an escape carrier or other inter-radio access technology (RAT) carriers may not always be available. For example, the escape frequency may not be deployed and/or may be congested. In these scenarios, a TDM scheme may be employed. However, when implementing a TDM scheme, measurements performed by the WTRU in order to support radio link operation and other LTE functionality (e.g., radio resource management (RRM), radio link monitoring (RLM), channel quality index (CQI) determinations) may be affected. In an example, a WTRU may be configured to utilize transmission gaps, patterns of transmission gaps, and/or specific discontinuous reception (DRX) patterns to implement a TDM scheme. For example, during ISM scheduled gaps (e.g., periods of time reserved for ISM transmissions, during which the LTE RAT may be inactive), the aggressor transmitter may create high interference in the victim receiver (e.g., the LTE receiver) and measurement samples obtained during the ISM scheduled period may be inaccurate and biased.

For example, if the WTRU performs measurements for Radio Link Monitoring (RLM) during a period of aggressor transmitter activity, the estimated radio link quality may be significantly impacted. In this situation, the WTRU may determine that the estimated radio link quality is below the Qout threshold for the specified evaluation period. The WTRU may report out-of-sync to higher layers, which may eventually result in a radio link failure if these conditions persist. Given that the WTRU is not actually receiving any DL LTE data (e.g., the ISM device is scheduled according to the TDM pattern), the interference seen during the ISM scheduled subframes may unnecessarily negatively impact the measurements. The result may be that the WTRU declares radio link failure even though no LTE transmissions are occurring.

Additionally, estimating the channel quality indicator (CQI) during periods of aggressor transmitter activity may result in lower CQI measurements values. For example, since these CQI values may be taken during known periods of high in-device interference, the values may represent an inaccurate channel quality, since the conditions would differ from the actual channel quality during periods scheduled for LTE transmission. During periods scheduled for LTE transmission, the ISM device may be in a silent state, and in device interference should be relatively low. A low CQI value derived during a period of ISM transmitter activity may unnecessarily trigger transmission changes to reduce downlink (DL) throughput during the LTE scheduled subframes. Reducing the DL throughput in favor of more robust transmissions, may be undesirable, as the LTE transmitter may already be in a time multiplexed scheme with the ISM transmitter, leading to a potentially significant degradation in performance.

For example, the intra-frequency measurement samples for the reference signal received power (RSRP) and the reference signal received quality (RSRQ), if taken during periods of aggressor transmitter activity, may be biased and deceptively low as compared to periods in which the LTE transceiver would be scheduled to transmit and/or receive. Biased RSRP and RSRQ measurements may lead to possible erroneous WTRU event triggering.

For purposes of illustration and simplicity of explanation, examples of in-device mutual interference problems are described with reference to mutual interference between and LTE transceiver and an ISM transceiver; however, as may be appreciated, other types of transceivers may also suffer of mutual interference, and the solutions are not limited to this example and may be applicable to any other wireless technologies. For example, other transceivers that utilize in device measurements may utilize the methods disclosed herein (e.g., 3GPP technologies, WCDMA, UMTS, etc.). Additionally, although the aggressor transmitter may be described herein as an ISM transmitter, and in-device interfering transmitter and/or receiver may be the cause of the interference/receiver saturation. Additionally, the terms ISM scheduled gap and non-LTE scheduled gap may be used interchangeably herein for purposes of illustration. ISM scheduled gaps may refer to periods of time during which an in-device transmitter is scheduled to transmit and/or receive over the ISM frequency band according to a TDM scheme configured within the WTRU. Non-LTE scheduled gaps may refer to periods of time during which an in-device transmitter is scheduled to transmit and/or receive using a transmission scheme other than LTE. However, the concepts disclosed herein may be equally applicable to ISM transmitters and non-LTE transmitters utilizing frequency bands that are near the frequency spectrum reserved for LTE transmission.

Figure 3:
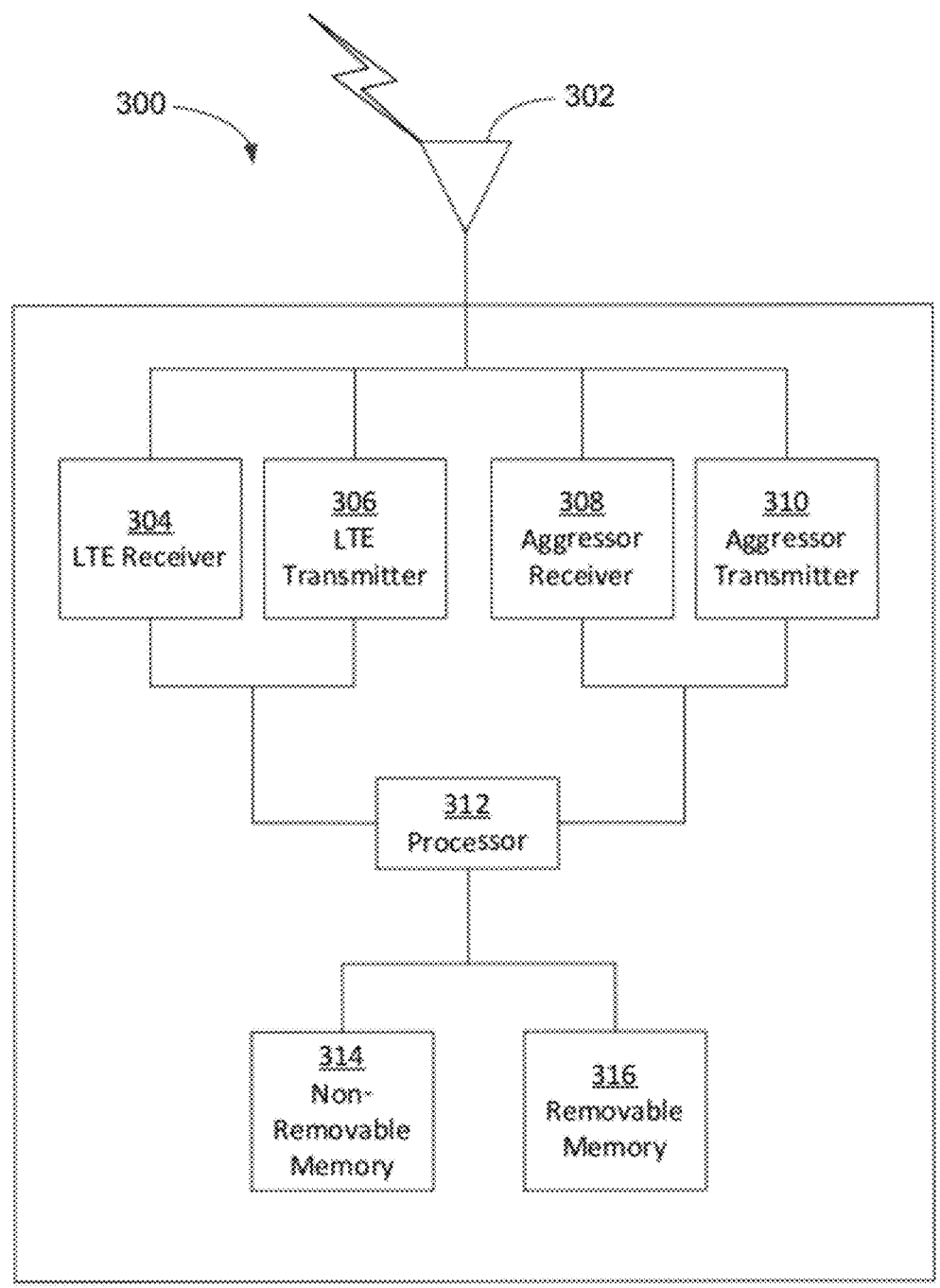
FIG. 3 illustrates an example device that may suffer from in-device interference.

FIG. 3 illustrates an example device that may suffer from in-device interference. Device 300 may be a WTRU. Device 300 may have one or more antenna(s) 302. Although shown as a single antenna in FIG. 3, antenna(s) 302 may be more than one antenna, for example an antenna array. Additionally, antenna(s) 302 may be two or more different types of antennas, for example LTE antenna(s) and ISM antenna(s). Although antenna(s) 302 is shown to be operably coupled to each of LTE Receiver 304, LTE Transmitter 306, Aggressor Receiver 308 and Aggressor Transmitter 310, on or more of antennas 302 may be coupled to a subset of components with Device 300. For example, a first antenna (or antennas) for LTE transmission may be coupled to LTE Receiver 304 and LTE Transmitter 306, but not to Aggressor Receiver 308 and Aggressor Transmitter 310. A second antenna (or antennas) for ISM or other transmission may be coupled to Aggressor Receiver 308 and Aggressor Transmitter 310, but not LTE receiver 304 and LTE Receiver 306. Although shown as separate nodes in FIG. 3, LTE Receiver 304 and LTE Transmitter 306 may be implemented as a single LTE transceiver. Similarly, although shown as separate nodes in FIG. 3, Aggressor Receiver 308 and Aggressor Transmitter 310 may be implemented as a single Aggressor transceiver.

Processor 312 may be operably coupled to each of LTE Receiver 304, LTE Transmitter 306, Aggressor Receiver 308 and Aggressor Transmitter 310. Although shown as a single processor in FIG. 3, Processor 312 may be one or more processors. For example there may be a dedicated processor for LTE operation and a dedicated processor for Aggressor operation. Additionally, multiple processors may implement the functions of Processor 312 (e.g., LTE transmission scheduling, LTE Gap Scheduling, LTE Measurement Scheduling, TDM/FDM scheduling, Aggressor transmission scheduling, Aggressor Gap Scheduling, Aggressor Measurement Scheduling, and/or the like). Processor 312 may be operably coupled to Non-Removable Memory 314 and Removable Memory 316. Processor 312 may store and/or delete data on Non-Removable Memory 314 and/or Removable Memory 316. Processor 312 may execute computer instructions stored on Non-Removable Memory 314 and/or Removable Memory 316. For example, mutual interference may be experienced when LTE Receiver 304 is active at the same time instant as Aggressor Transmitter 310. Similarly, mutual interference may be experienced when Aggressor Receiver 308 is active at the same time instant as LTE Transmitter 306.

According to an example, a wireless device may include a plurality of components or devices that may support different LTE technologies. The co-existence of such components in the wireless device may create interference amongst the various LTE technologies supported therein. For example, a first component included in the wireless device to support one LTE technology may create interference with a second component in the wireless device to support a different LTE technology when the first and second component may be transmitting and/or receiving signals at the same time.

Described herein are methods, procedures, rules and/or protocols that may enable mitigation of such an interference that may be created or exist in i a wireless device that supports multiple radio access technologies ("a multi-RAT device") including, for example: prediction or detection of an interference situation (e.g., a potential interference or actual measured interference) in the multi-RAT device; reporting or notifying an interference situation to a network; solutions or mechanisms for preventing an interference situation in the multi-RAT device; methods for scheduling measurements based on the interference, and in-device inter-radio access technology (RAT) coexistence operation procedures used for an interference situation in the multi-RAT. The following methods, procedures, rules, and/or protocols described herein may be used in any variation and/or combination.

For example, as described above, a wireless device may include multiple devices or components such as transceivers, receivers, modems, controllers, applications, processors, and the like that may support multiple radio access technologies and/or applications such as technologies including LTE, LTE-A, UMTS, GSM, WIMAX, AMPS, CDMA, E-UTRAN, and/or the like. Example ISM technologies may include, for example, Bluetooth® and WiFi, and/or the like. Example GPS technologies may include GPS, Galileo, Glonass, and/or the like; and/or any other radio access technology.

Figure 4:
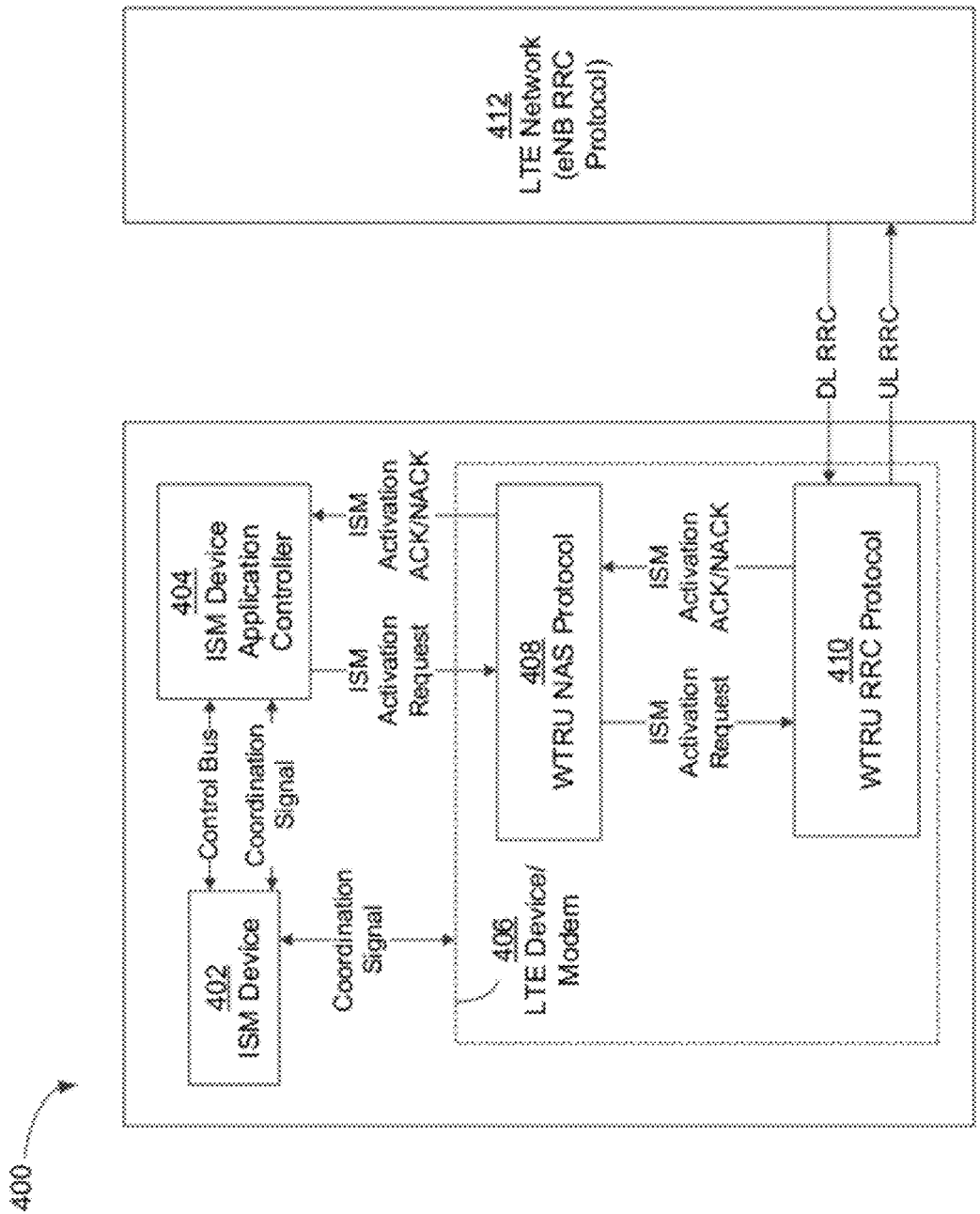
FIG. 4 depicts an example of a potential interfering technology device application controller and protocol stack.

FIG. 4 illustrates an example embodiment of a wireless device 400 such as a WTRU, router, eNodeB, computing device including, for example, a laptop, desktop, server, tablet, e-reader, and the like with multiple components that support multiple radio technologies ("a multi-RAT device"). As shown in FIG. 4, the wireless device 400 may include an ISM device 402. The ISM device 402 may include one or more components such as transceivers, receivers, modems, controllers, processor, applications, and the like that may support ISM technologies including transmitting and/or receiving signals on frequencies or bands associated with ISM technologies. The ISM device 402 may be in communication with an ISM application controller 404 that may be configured to activate the ISM device 402 such that the ISM device may receive and/or transmit signals on the frequencies or bands associated with ISM technologies. The ISM application controller 404 may further be configured to process such transmitted and/or received signals in an example.

As shown in FIG. 4, the wireless device 400 may further include one or more LTE devices or components such as LTE Device/Modem 406 that may be in communication with the ISM controller 404, for example. The one or more LTE devices or components such as the LTE Device/Modem 406 may include various modules, devices, and/or components including, for example, one or more transceivers, modems, applications, processors, stacks, storage or memory devices, and the like. For example, as shown in FIG. 4, the LTE Device/Modem 406 may include WTRU Non-access stratum (NAS) Protocol Stack 408 associated with the LTE Device/Modem 406. According to an example, the one or more LTE devices or components such as the LTE Device/Modem 406 may be configured to transmit, receive, and/or process signals transmitted and/or received on the frequencies or bands associated with LTE technologies.

The wireless device 400 may also include an WTRU radio resource control (RRC) Protocol Stack 410 as shown in FIG. 4. The WTRU RRC Protocol Stack 410 may include one or more components such as storage modules, processors, transceivers, and/or the like. WTRU RRC Protocol Stack 410 may detect an interference situation between components supporting the radio access technologies, generate a notification including information associated with such an interference situation, transmit or send such a notification, receive information including an action configured to mitigate such an interference situation, process the received information such that the action may be performed, and may perform a mitigation action when signals cannot be sent or received by the wireless device.

In an example embodiment, the wireless device 400 may further include other components or devices that support radio access technologies such as a GPS component (not shown). The wireless device 400 may also be in communication via, for example, a wireless link with a network 412. According to an example, the LTE network 412 may be any suitable network (or components thereof) associated with a radio access technology such as the RAN 104, base station 114a, 114b, etc., and the like shown in FIGS. 1A-1C that may enable data transmission and/or receipt (such as cellular, text, video, IP, multimedia, and the like transmission and/or receipt) to the wireless device 400 via one or more communication links such as air interfaces on one or more frequency bands.

The following terminology may be used to describe WTRU operations, ISM device operations, wireless network operation, and/or multicarrier systems. A primary cell may be a wireless cell where the main control signaling of the device may take place (e.g., secondary cell activation/deactivation procedures) and may serve as the mobility anchor for the device. The primary cell may be the cell a network associates with the location of the device. The primary cell may be referred to as a Pcell. A secondary cell may be a cell which is utilized by the wireless device for carrying additional traffic. The device may measure secondary cells regularly. Secondary cells may be active or de-active depending on transmission conditions and load. A secondary cell may be referred to as a Scell. An aggressor transmitter (e.g., possibly in a non-licensed ISM band) may be referred to as an ISM device for ease of explanation. However, devices operating in non-ISM bands may also be aggressor transmitters. Specific in-device gaps may refer to specific gaps or gap patterns that a WTRU may use for TDM operation of two technologies within the same device. These gaps may be comprised of times where LTE is not scheduled or not allowed to be scheduled. When referred to hereafter, the periods of time where the WTRU will be scheduled for LTE operation (e.g., the periods of time when the other/aggressor technology is not transmitting or receiving) will be referred to as LTE scheduled transmission gaps. During LTE scheduled transmission gaps, the other technology (e.g., aggressor) may not operate or may not be allowed to operate (e.g., schedule transmissions). Periods during which the ISM/aggressor technology may be transmitting and/or may be allowed to transmit may be referred to as LTE unscheduled periods or ISM scheduled transmission gaps.

These definitions and example explanations are for ease of reading and comprehension, and they are not meant to be limiting. When referred hereafter an ISM device or ISM may refer to an ISM technology such as Bluetooth and/or Wi-Fi. However, the concepts disclosed may be applicable to technologies operating outside the ISM band, for example GPS. As illustrated above, the ISM technologies may co-exist with another technology in the same device.

When referred hereafter an LTE device, LTE or LTE technology may also apply to a spectrum licensed telecommunication developed technology such as UMTS, GSM, WIMAX, AMPS, CDMA, WCMDA, etc., as is described above.

An interference aggressor may refer to a transmitter and/or receiver of a technology creating interference to a receiver of another technology. For example, an interference aggressor may be transmitting, which causes interference to be present at the receiver of another technology. Receiver experiencing the interference may be referred to as an interference victim. The interference aggressor and the interference victim may be within the same WTRU.

The following describes methods that allow a WTRU to perform accurate measurements and measurement reporting while operating in a TDM fashion with another technology in the same device. The other technology may be a potential interference aggressor, while the measurements may be associated with the operation of an interference victim.

Various methods may be used to implement a TDM scheme between an interference aggressor and an interference victim. For example, if the interference victim is an LTE receiver, explicit patterns may be signaled by the LTE network for LTE operations. For example, the LTE network may send an indication of what times/subframes may be associated with LTE scheduled transmission gaps. This information may be used by the device to assign the LTE unscheduled periods as ISM scheduled transmission gaps. Knowledge of the explicit pattern of scheduled and unscheduled periods that are provided to and/or configured in the WTRU may allow in-device co-existence in the interference prone frequency(ies). These patterns may be explicitly signaled to the WTRU by the LTE network, according to any of the in-device procedures, or they may be requested by the WTRU to the LTE network. In an example, the TDM patterns may be pre-configured in the WTRU. The methods and systems described herein may be applicable regardless of the methods in which the TDM pattern is provided or determined.

In order to report and take accurate measurements of the quality of the cells on a given frequency, measurements may be taken of the frequency to determine if it is of a sufficient quality to support operation. However, if the TDM schedule is not taken into consideration when determining the measurement times, a measurement may be taken during the unscheduled LTE periods, meaning that the measurement occurs during the gaps of time that are allocated for transmission of the other ISM technology in the same device (e.g., the interference aggressor). For example, the WTRU may measure the RSRQ of the cells in a frequency that may be affected by interference aggressor operation during the times when the interference aggressor is transmitting. Such a measurement may be biased, and the use of the measurement may adversely affect LTE operation. In an example, the knowledge of the TDM pattern between the interference aggressor and the interference victim may be used to schedule the measurement during periods of time during which the LTE technology is active according to the pattern. In addition to RSRQ measurements, knowledge of the TDM pattern may utilized to schedule RSRP measurements. In this example, the measurements may reflect the channel quality that would be expected during subsequent LTE operation.

In an example, the LTE network may explicitly signal a specific pattern that a WTRU may use for measurement purposes. These patterns may be similar to the TDM scheme pattern that allocates transmission times between the LTE device and the ISM device. For example, the measurement pattern signaled by the LTE network may provide the WTRU with specific times (e.g., subframes) during which it may be allowed to take LTE related measurements. Different measurement patterns may be utilized for different LTE measurements. For example, a first measurement pattern may be signaled for radio resource management (RRM) related measurements and a second, different pattern may be signaled for radio link management (RLM) related measurements. Similarly, a third measurement pattern may be signaled for channel state information (CSI) related measurements. In an example, the first, second and/or third measurement pattern may be the same. In another example, each of the first, second, and/or third measurement patterns may be different. In another example, a subset of the first second or third measurements may be the same, while at least one measurement pattern may be different. In an example, the LTE network may signal a common pattern that may be used to measure the different quantities.

In an example, the WTRU may be configured to determine the appropriate, non-interfering measurement occasions based on a known traffic pattern. For example, in order to determine and perform intra-frequency measurements when in-device gaps or TDM scheme is configured for the LTE and/or the ISM devices, the WTRU may re-align periodical measurements sample periods in order to avoid the ISM scheduled transmission periods. For example RSRP and RSRQ measurements may be re-aligned to occur during a LTE scheduled period. Other factors may also be considered when determining the times/subframes associated with measurement occasions, for example other measurement requirements. For example, certain measurements such as RSRP and/or RSRQ measurements may be designed to provide at least two samples for each 200 ms period when no DRX cycle is configured. Such conditions may be taken into account when determining an appropriate measurement sampling schedule.

Figure 5:
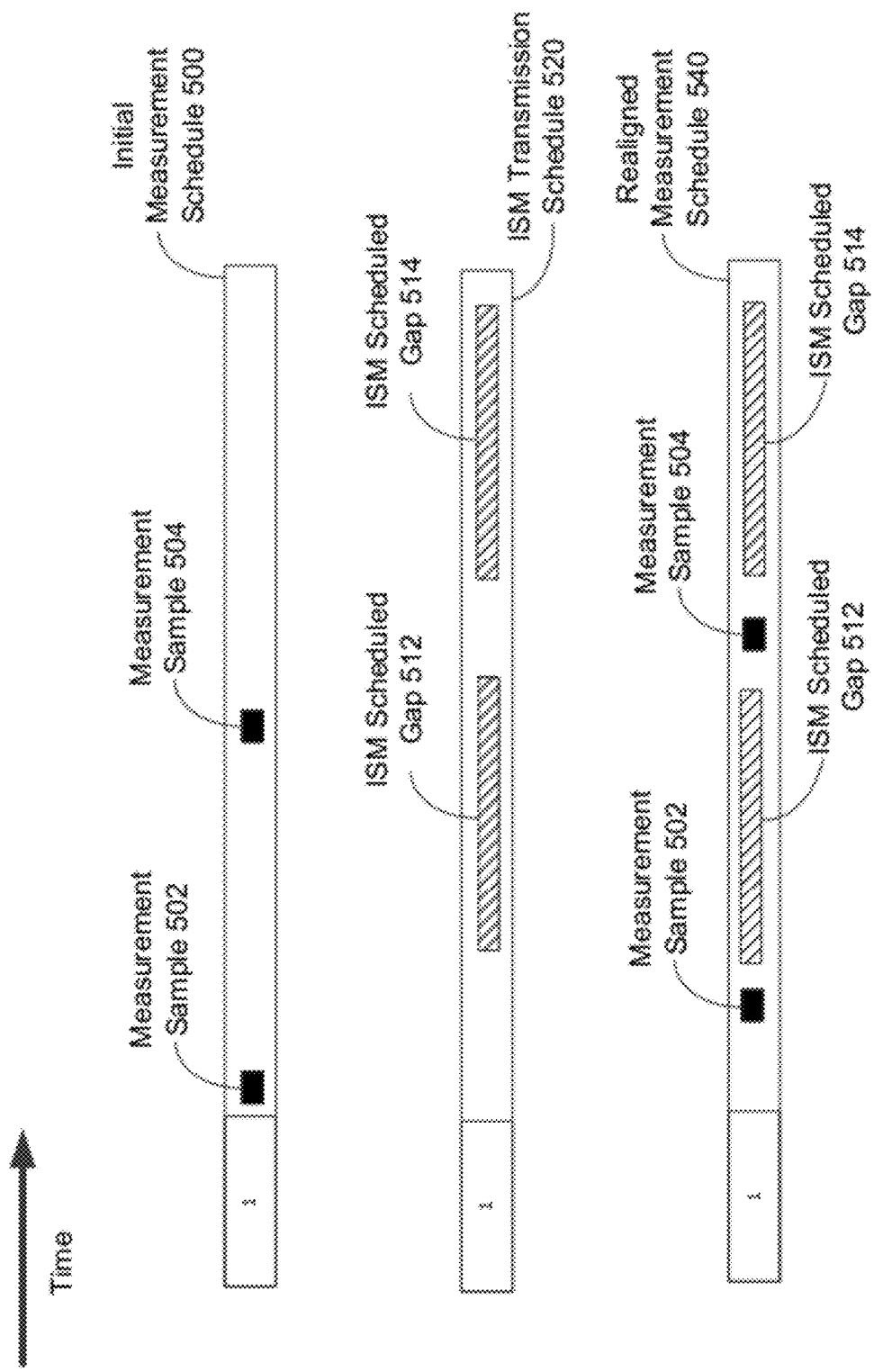
FIG. 5 illustrates an example of WTRU re-aligned measurement occasions.

FIG. 5 illustrates an example measurement re-alignment that may be performed. For example, as shown in FIG. 5, a WTRU may have an Initial Measurement Schedule 500. The Initial Measurement Schedule 500 may include periodically scheduled measurements and/or aperiodically scheduled measurements. For example, Initial Measurement Schedule 500 may include Measurement Sample 502 and Measurement Sample 504. For purposes of illustration and explanation, Measurement Sample 502 and Measurement Sample 504 may be periodic measurements which are repeatedly performed during WTRU operation. Upon establishing a TDM scheme between LTE device operation and ISM device operation, the WTRU may establish ISM Transmission Schedule 520. ISM Transmission Schedule 520 may include ISM Schedule Gap 512 and ISM Scheduled Gap 514. During periods of time associated with ISM Schedule Gap 512 and Ism scheduled Gap 514, the WTRU may be configured to refrain from using a LTE transmitter and/or receiver. The periods of time associated with ISM Schedule Gap 512 and ISM Scheduled Gap 514 may be for ISM device transmission and/or reception. ISM Transmission Schedule 520 may be set by the WTRU and/or may be signaled by the LTE network.

Upon establishing, ISM Transmission Schedule 520, the WTRU may determine that at least one of Measurement Sample 502 or Measurement Sample 504 coincides with ISM operation during ISM Transmission Schedule 520. For example, at least one of Measurement Sample 502 or Measurement Sample 504 may coincide with at least one of ISM Schedule Gap 512 or ISM Scheduled Gap 514. For example, as shown in FIG. 5, Measurement Sample 504 may coincide with ISM Schedule Gap 512. The WTRU may determine to shift Measurement Sample 502, Measurement Sample 504 and/or other measurements associated with Initial Measurement Schedule 500 based on the determination that one or more measurements are scheduled to occur during a non-LTE transmission gap (e.g., ISM Scheduled Gap 512 or ISM Scheduled Gap 514).

For example, Realigned Measurement Schedule 540 illustrates the result of the WTRU changing the measurement schedule based on the in-device TDM pattern. As shown, Measurement Sample 502 and Measurement Sample 504 may be scheduled during periods of time that differ for time periods associated with ISM Scheduled Gap 512 and ISM Scheduled Gap 514. For example, Measurement Sample 502 and/or Measurement Sample 504 may be scheduled during LTE scheduled transmission gaps. Additionally, measurement samples that do not coincide with a non-LTE scheduled gap may be rescheduled/realigned if other measurements associated with the measurement samples that do not coincide with a non-LTE scheduled gap are rescheduled/realigned. For example, as shown in FIG. 5, Measurement Sample 502 may occur at a different time than any ISM scheduled gaps associated with ISM Transmission Schedule 520 (e.g., ISM Scheduled Gap 512 or ISM Scheduled Gap 514). However, a condition for Measurement Sample 502 may be that the measurement associated with Measurement Sample 502 is to be performed within a specified period time from the measurement performed to determine Measurement Sample 504. For example, if the difference in time between the sampling time for Measurement Sample 502 and realigned Measurement Sample 504 is greater than a predetermined threshold, Measurement Sample 502 may also be realigned in order to make the difference in time between realigned Measurement Sample 502 and realigned Measurement Sample 504 less than the threshold. In an example, if the WTRU is configured to perform DRX, if the ISM scheduled transmission periods are too long in time so as to prevent a specified minimum number of samples during LTE scheduled gaps, the WTRU may re-align its measurement to a different DRX cycle length reporting and detection requirement.

For Example, using Equation (1) below, a WTRU may determine the number of cells that it may report measurements for based on the time available for LTE scheduled gaps.

$$Y_{measurement\ intra} = Floor\left\{X_{basic\ measurement\ FDD} \cdot \frac{T_{Intra}}{T_{Measurement\_Period,\ Intra}}\right\} \quad \text{Equation (1)}$$

$X_{basic\ measurement\ FDD}$ may be equal to eight (8), since a WTRU may typically measure up to a maximum of 8 cells during a given measurement period. $T_{Measurement\_Period,\ Intra}$ may be the length of a typical measurement period, for example 200 ms for intra-frequency RSRP measurements. $T_{intra}$ may be the time that is available for intra-frequency measurements. For example, the time available for intra-frequency measurements may be when the LTE receiver is available to be active on the intra-frequency carrier. In this example, the in-device non-LTE specific gaps may be excluded from the determination of $T_{Intra}$. Time during which an interference aggressor may be transmitting may be excluded from the determination of $T_{Intra}$. $Y_{measurement\ intra}$ may be the number of cells for which a WTRU is capable of supporting intra-frequency measurements based on the specified TDM pattern. The number of cells for which a WTRU is capable of supporting intra-frequency measurements based on the specified TDM pattern may correspond to the number cells the WTRU may choose to report measurements for to the LTE network.

The WTRU may determine the number of cells to report measurements for based on the available active time for LTE DL operation over a 200 ms period. For example, if the in-device specific gaps during a 200 ms period correspond to 100 of the available 200 ms, the WTRU may report a maximum of four (4) cells.

In an example, when specific, in-device gaps patterns are signalled (e.g., the TDM schedule is established between the LTE device and the ISM device), the intra-frequency measurements may be suspended or postponed if scheduled during periods of aggressor transmitter activity due to the high interference caused by the in-device ISM aggressor transmitter. In an example, the in-device ISM scheduled transmission gaps may be up to several radio frames (e.g., tens of ms) or even tens of radio frames, depending on the type of traffic pattern of the aggressor transmitter.

The patterns of measurement gaps for inter-frequency and inter-RAT measurements may be taken into account. Typical inter-frequency and inter-RAT gaps may have a fixed duration of six (6) ms and a repetition period of 40 or 80 ms. Based on the combinations of durations and repetition periodicity, two types of patterns are potentially available for typical inter-frequency and inter-RAT gaps.

In an example, the WTRU may be configured to perform inter-frequency and/or inter-RAT measurements during the in-device ISM scheduled transmission gaps. As the inter-frequency and/or inter-RAT measurements may be measuring frequencies that would not be affected or less affected by aggressor transmitter activity, knowledge of the TDM pattern may be utilized to perform the measurements during the non-LTE scheduled gaps, provided the non-LTE gaps are long enough to perform measurements and/or meet measurement requirements. If the WTRU has configured an in-device TDM pattern, the LTE network may schedule measurement gaps for inter-frequency or inter-RAT measurements based on the pattern if it is provided to the LTE network. In an example, the LTE network may configure the WTRU with a normal type 1 or type 2 measurement gaps for inter-frequency/inter-RAT measurements. In addition to the LTE network scheduled inter-frequency/inter-RAT measurement gaps, the WTRU may perform the inter-frequency and/or inter-RAT measurements during the non-LTE scheduled gaps.

Figure 6:
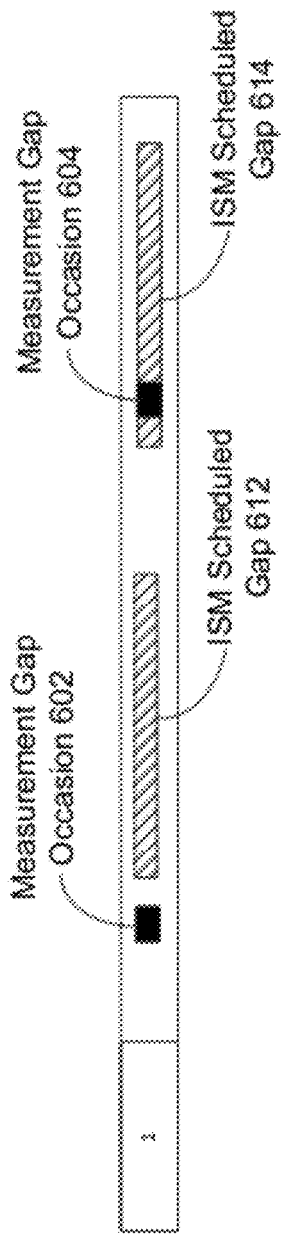
FIG. 6 illustrates an example of WTRU measurement gaps occasion.

For example, as shown in FIG. 6, the LTE network may schedule Measurement Gap Occasion 602 and/or Measurement Gap Occasion 604 to allow the WTRU to perform inter-frequency and inter-RAT measurements. Measurement Gap Occasion 602 and/or Measurement Gap Occasion 604 may coincide with ISM Scheduled Gap 612 and ISM Scheduled Gap 614, which may be periods of time reserved in the in-device TDM scheme for ISM device operation. For example, Measurement Gap Occasion 604 may coincide with ISM Scheduled Gap 614 as shown in FIG. 6. If the LTE network schedule measurement occasion coincides with an ISM scheduled gap, the WTRU may perform inter-frequency and/or inter-RAT measurements during the scheduled measurement gap occasion. If the LTE network scheduled measurement gap occasion occurs during a period not associated with an ISM scheduled gap (e.g., Measurement Gap Occasion 602), the WTRU may be configured to determine to perform the measurement during either of the LTE network scheduled measurement gap occasion or the in device ISM scheduled gap. For example, the determination of when to perform the inter-frequency and/or inter-RAT measurement may be based on which time periods allow for the measurement samples to have a minimum distance for physical layer measurement averaging (e.g., filtering). In FIG. 6, the WTRU may use any of Measurement Gap Occasion 602, Measurement Gap Occasion 604, ISM Scheduled Gap 612, or ISM Scheduled Gap 614 for performing inter-frequency and/or inter-RAT measurements, thereby allowing for extended measurement occasions.

In order to avoid declaring radio link failure based on inaccurate or biased measurements, the WTRU may avoid taking measurement samples for radio link monitoring purposes during periods of the aggressor transmitter activity if the WTRU is configured to operate using an in-device TDM scheme. For example, the WTRU may perform measurements during the periods where the aggressor transmitter is inactive or during the LTE scheduled gaps according to the configured pattern.

In an example, if the length of ISM scheduled transmission gaps is less than a radio frame length (e.g., 10 ms), the evaluation period for declaring radio length failure may be 200 ms and 100 ms for Out-of-Sync measurements and In-Sync measurements, respectively. In this example, the WTRU may refrain from performing measurements and determining measurement samples for radio link (RL) quality in subframes occurring during specific, in-device ISM scheduled transmission gaps, during which the aggressor transmitter may be active. Instead, the WTRU may perform the measurements during the LTE scheduled transmission gaps.

If the length of the ISM scheduled transmission gaps is greater than a radio frame length, the WTRU may autonomously align the evaluation period to the closest DRX Qout/Qin evaluation periods. For example, the WTRU may be configured to align the measurements based on the difference in the length of the LTE scheduled period and the length of the ISM scheduled transmission gaps. In an example, the length of the evaluation period may be determined based on the sum of the LTE scheduled period and the non-LTE scheduled period. In an example, the WTRU may determine the RLM evaluation periods based on the length of the configured non-LTE scheduled gap. For example, Table 1 illustrates an example for determining the RLM evaluation periods based on the non-LTE scheduled gap length. For example based on Table 1, if the currently configured, in-device non-LTE scheduled gap is determined to have a value between 0.04 s and 0.64 s, the length of the evaluation periods may be determined to be 10 times the non-LTE scheduled gap length.

TABLE 1

| Non-LTE Scheduled Gap length (s) | $T_{Evaluate\_Q_{out\_GAP}}$ and $T_{Evaluate\_Q_{in\_GAP}}$ (s) (Number of Gap Lengths) |
|---|---|
| ≤0.04 | Note (20) |
| 0.04 < Gap Length ≤ 0.64 | Note (10) |
| 0.64 < Gap Length ≤ 2.56 | Note (5) |

Note:
Evaluation period length in time depends on the length of the Non-LTE Scheduled Gap in use In an example, the LTE network may send a scaling factor for the evaluation period(s) to the device. For example, the LTE network may send an index to a table that associates in-device ISM scheduled transmission gap patterns with corresponding evaluation periods for out-of-sync measurements and/or in-sync measurements. In this example, the WTRU may be configured to perform the measurements in subframes during the duration of the in-device specific LTE scheduled transmission gaps, as the LTE scheduled gaps may be less prone to interference. The WTRU may extend the evaluation periods (windows) for RLM measurements using the scaling factor.

In an example, if the in-device TDM gaps pattern is not uniform and/or the distribution of non-LTE scheduled gaps to LTE scheduled gaps does not allow for analogous association to a DRX cycle length, then the LTE network may send an indication of a scaling factor for the evaluation periods. For example, the scaling factor may be used as a multiplier to scale the 200 ms evaluation period for $T_{Evaluate}$ Qout. The same scaling factor or a second scaling factor may be used as a multiplier to scale the 100 ms evaluation period for $T_{Evaluate}$ Qin. The scaling factor or scaling factors may be sent from the eNB to the WTRU. The scaling factors may be sent in response to the WTRU providing the in-device TDM pattern to the LTE network.

CQI measurements and reporting may be determined based on the TDM scheme (e.g., the pattern of LTE scheduled gaps and non-LTE scheduled gaps). For example, the WTRU may be configured to evaluate CQI during LTE scheduled gaps. When the WTRU receives and/or determines the in-device, specific LTE scheduled gaps, a WTRU may determine to evaluate the CQI during LTE scheduled gaps, thus avoiding unnecessarily low CQI values due to aggressor interference. By evaluating the CQI during LTE scheduled gaps, the WTRU may maintain the current LTE DL throughput and the modulation and coding scheme (MCS) based on a more accurate DL channel quality estimation than may be seen during the non-LTE scheduled gaps. For example, once the LTE network sends an indication of the TDM pattern to the WTRU or the WTRU sends an indication of the TDM pattern to the LTE network (e.g., depending on which device is selecting the pattern), the WTRU may determine to forgo reporting and/or measuring/evaluating CQI during the non-LTE scheduled transmission periods/LTE unscheduled transmission periods.

The WTRU may be configured to perform measurements for CQI reporting based on rules that take into account the length of LTE scheduled transmission gaps and/or the length of the non-LTE scheduled transmission gaps. For example, the WTRU may be configured to perform normally scheduled CQI measurements during the LTE scheduled periods and to take no CQI measurements during the non-LTE scheduled periods (e.g., the ISM scheduled periods). When the non-LTE scheduled gap ends, if the WTRU determines that a CQI report is to be sent in the next available transmission time interval (TTI) (e.g., a CQI report may be due in the next TTI according to the periodic measurement reporting schedule and/or an aperiodic CQI report has been trigger for the next TTI), then the WTRU may be configured to perform one or a combination of the following actions. For example, the WTRU may be configured to report the last available CQI measurement if the last CQI measurement available prior to the non-LTE scheduled transmission gap period is not older than a specified time period. If the last CQI measurement available was performed more than a specified period of time from the present (e.g., the length of the age of the measurement is greater than the specified period of time), the WTRU may be configured to disregard the old CQI measurement and perform a new measurement based on the a CSI-RS occurrence during a LTE scheduled gap. By discarding the old data and waiting for the next CSI-RS in an LTE scheduled gap to perform the measurement, the WTRU may ensure the evaluated CQI measurement is up-to-date and accurate. In an example, if the WTRU determines that a CQI report is to be sent in the next available TTI, the WTRU may determine the next available subframe in which there is a CSI-RS scheduled occurrence and either no non-LTE transmission will occur (e.g., the ISM device may send an indication that will not be transmitting in a subframe reserved as a non-LTE scheduled gap) or is associated with an LTE scheduled gap period. The WTRU may perform the measurement if it determines the aggressor transmitter will not be in operation and a CSI-RS will be transmitted from the eNB. Once an accurate measurement has been performed, the WTRU may report the measurement value to the LTE network.

The WTRU may be configured report the CQI based on rules that take into account the length of LTE scheduled transmission gaps and/or the length of the non-LTE scheduled transmission gaps. For example, the WTRU may report a CQI value following the end of the non-LTE scheduled transmission gap. Additionally, the WTRU may be configured to wait a specified time period after the completion of a non-LTE scheduled transmission gap (e.g., wait a specified number of subframes after the end of the non-LTE scheduled period) to report a CQI value. For example, the WTRU may postpone the CQI reporting for at least one subframe after the completion of the non-LTE scheduled gap to allow for transmission of the CQI report to occur in the first full subframe in which the non-LTE/ISM device is inactive. By waiting at least one subframe after the completion of the non-LTE scheduled period, a WTRU may perform accurate LTE DL channel CQI estimation with the knowledge that the aggressor transmitter may be inactive.

In an example, the WTRU may be configured to perform CQI reporting in the first reporting opportunity after the ISM scheduled transmission gap. For example, the identity of the first reporting opportunity may be determined based on the initial CQI periodic reporting conditions configured for WTRU. In an example, the WTRU may postpone the CQI reporting for at least one subframe after the completion of the non-LTE scheduled gap to allow for a network CQI report request corresponding to the first full subframe in which the non-LTE/ISM device is inactive. In an example, WTRU may perform CQI reporting after the completion of a non-LTE scheduled transmission gap at the occurrence of the first CQI reporting opportunity after CSI-RS have been received from the DL LTE channel during the LTE scheduled gap.

The WTRU may estimate and report CSI or other types of measurements (e.g., RSRQ or RSRP) to indicate the channel conditions and expected performance in one more of the following scenarios. For example, the WTRU may be configured to determine and/or report the measurement, for example CSI or RSRQ or RSRP, during subframes for which ISM interference is known not to occur (e.g., "un-interfered CSI" or "un-interfered RSRQ" or "un-interfered RSRP")). To estimate un-interfered measurements, the WTRU may be configured to perform and average interference measurements over subframes during which interference is known not to occur. For example, the subframes during the LTE scheduled gap may be subframes during which the WTRU may determine the un-interfered CSI or in case of other measurements un-interfered RSRQ or un-interfered RSRP. Additionally, the WTRU may determine the un-interfered measurement during the ISM scheduled period, for example if the WTRU determines the ISM transmitter will not be active in a given ISM scheduled subframe. In an example, the WTRU may be configured to determine and/or report the CSI during subframes for which ISM interference is known to occur (e.g., "interfered CSI" or "interfered RSRQ" or "interfered RSRP"). To estimate the interfered measurements (e.g. "interfered CSI") the WTRU may perform and average interference measurements over subframes during which interference is known to occur. For example, for RLM measurements, the UE may estimate the "interfered RSRQ or RSRP" measurement over sub-frames during which interference is known to occur (e.g., on the knowledge of transmission opportunities from the other technology). In an example, the WTRU may be configured to determine and/or report the CSI or RRM measurements during subframes belonging to the ISM scheduled or non-LTE scheduled period (e.g., "ISM-scheduled CSI" or "non-LTE scheduled CSI" or "aggressor-scheduled CSI"). ISM interference may or may not occur during the ISM scheduled period, depending on the current load conditions for the ISM transmitter. In an example, the WTRU may be configured to determine and/or report the CSI during subframes belonging to the "LTE scheduled" period (e.g., "LTE scheduled CSI) during which ISM interference does not occur.

The WTRU may be configured to determine whether interference from an ISM transmitter occurs in at least one specified subframe. For example, in order to determine the un-interfered measurement (e.g., "un-interfered CSI") or the interfered measurement (e.g., interfered CSI), the WTRU may determine whether interference from an ISM device has occurred during a subframe during which a measurement was performed. The WTRU may be configured to determine whether ISM interference has occurred based on a determination as to whether the concerned subframe(s) occurs during the LTE scheduled period or the ISM scheduled period. For example, the WTRU may determine that ISM interference does not occur during an LTE scheduled period, and that it may determine the un-interfered CSI during the LTE scheduled period. In an example, the WTRU may be configured to determine whether ISM interference has occurred based on detecting whether there the transmitter for the co-existing technology (e.g., the ISM transmitter) is active and/or transmitting during the concerned subframe(s).

The WTRU may report an un-interfered CSI based on the occurrence of one or more of the following conditions. For example, the WTRU may be configured to report the un-interfered CSI based on the CSI report being transmitted in a subframe during which ISM interference does not occur. In an example, the WTRU may be configured to report the un-interfered CSI based on the CSI report being transmitted in a subframe occurring during the LTE scheduled period. In an example, the WTRU may be configured to report the un-interfered CSI based on the CSI report being a periodic CSI report. In an example, the WTRU may be configured to report the un-interfered CSI based on the CSI report being an aperiodic CSI report. For example, if an aperiodic CSI request was transmitted during a subframe during which ISM interference does not occur or the aperiodic CSI request was transmitted during a subframe occurring during the LTE scheduled period, the WTRU may report an un-interfered CSI.

The WTRU may report an interfered CSI based on an occurrence of one or more of the following conditions. For example, the WTRU may be configured to report the interfered CSI based on the CSI report being transmitted in a subframe during which ISM interference occurs. In an example, the WTRU may be configured to report the interfered CSI based on the CSI report being transmitted in a subframe occurring during the "ISM scheduled" period. In an example, the WTRU may be configured to report the interfered CSI based on the CSI report being a periodic CSI report. In an example, the WTRU may be configured to report the interfered CSI based on the CSI report being an aperiodic CSI report and the aperiodic CSI request was transmitted during a subframe during which ISM interference occurs or the aperiodic CSI request was transmitted during a subframe occurring during the "ISM scheduled" period. In an example, the WTRU may be configured to report both interfered CSI and un-interfered CSI, for example based on the occurrence of one or more of the conditions identified herein.

The WTRU may report an ISM-scheduled CSI based on an occurrence of one or more of the following conditions. For example, the WTRU may be configured to report the ISM-scheduled CSI based on the CSI report being transmitted in a subframe occurring during the ISM scheduled period. In an example, the WTRU may be configured to report the ISM-scheduled CSI based on the CSI report being an aperiodic CSI and the aperiodic CSI request being transmitted during a subframe occurring during the ISM scheduled period.

The WTRU may indicate the type of CSI report (e.g., Interfered CSI, un-interfered CSI, ISM-scheduled CSI, LTE scheduled CSI, etc.), using one or more of the following indications. For example, the WTRU may be configured to implicitly indicate the type of CSI report based on the timing of the subframe in which the report is transmitted. As an example, the timing may be expressed in terms of a subframe number and/or system frame number. The LTE network may interpret the indication of the timing of the report to determine the type of CSI being reported. In an example, the WTRU may be configured to implicitly indicate the type of CSI report based on whether the CSI is reported during a LTE-scheduled period or an ISM-scheduled period. For example, the WTRU may report an un-interfered CSI during the LTE-scheduled period and/or may report an interfered CSI during the ISM-scheduled period. In an example, the WTRU may be configured to explicitly indicate the type of CSI report by setting the value of a "CSI-type" field, which may be appended to the information bits of the CSI report. For example, a first value of the "CSI-type" could indicate that the report is an interfered CSI, a second value may indicate that the report is an un-interfered CSI. In an example, the WTRU may be configured to explicitly indicate the type of CSI report by transmitting the report over a MAC PDU, using a MAC control element (CE). The report may include a CSI-type field appended to the information bits of the CSI report. In an example, different MAC CEs or headers may be used to indicate whether the report corresponds to an interfered CSI, un-interfered CSI, ISM-scheduled CSI, and/or LTE scheduled CSI.

The WTRU may trigger a CSI report according to one or more of the following conditions. For example, a WTRU may be triggered to send a CSI report when transitioning from an ISM scheduled period to an LTE scheduled period. For example, an LTE scheduled CSI may be transmitted based on a determination by the WTRU a LTE scheduled period has commenced. In an example, a CSI report may be triggered a specified number of subframes following the termination of transmissions from the ISM device. By waiting the specified number of subframes, the WTRU may allow the LTE network to acquire the correct CSI report in order to properly schedule the WTRU during scheduled periods. The number of subframes after completion of ISM transmissions that the WTRU may wait before triggering the report may be configurable or pre-configured or may be the first subframe the WTRU may perform measurements (e.g., the subframe during which a CSI-RS is transmitted during LTE scheduled periods). In an example, a WTRU may be triggered to send a CSI report when the ISM device begins transmitting during an ISM scheduled period.

As may be appreciated, the CSI reporting and measurement triggers, indications, reporting periodicity, and types of reports described herein are applicable to the other various scenarios described herein. For example, any combination of reporting triggers and/or types of report may be utilized. In an example, multiple types of CSI reports may be triggered by a single event.

In an example, interfered measurements and/or un-interfered measurements (e.g., RSRQ or RSRP measurements) may be reported according to triggering criteria, for example as configured by the network. For example, an interfered measurement may be sent to the network if the interfered measurement value is below a configured threshold (optionally for a certain duration). Such a measurement may an interference situation). In the report the WTRU may indicate that it is an interfered measurement report. The report may also contain an un-interfered measurement value and/or a value of measurement averaged over both interfered and un-interfered subframes. The measurement may also indicate a period. The network may explicitly indicate to the WTRU what type of measurements to report for a configured measurement type or event (e.g., the network may configure an event and indicate what measurement the UE should take and use to evaluate the events). For example, the UE may configure an event that is triggered when a measurement quality of a cell, neighboring or serving, goes above or below a threshold and may indicate whether an interfered report should be used to evaluate and trigger the report. In an example, the type of event may be implicitly determined based on the configured event. For example, a new event or report to be triggered and evaluated with interfered measurements may be introduced. When the WTRU is configured with this event it knows that it should used an interfered measurement if any to evaluate and trigger the events. The same may be equally applicable to un-interfered sub-frames.

The WTRU may be configured to implicitly operate according to a TDM pattern signaled by the LTE network. For example, the WTRU may be configured to send an indication of the activation of the aggressor in-device transmitter to the LTE network. In response, the LTE network may send a pattern of specific, in-device gaps to the WTRU. The WTRU may be configured to operative adaptively (e.g., perform measurements, report measurements) based on the traffic patterns from the interfering aggressor transmitter.

For example, the aggressor transmitter may signal transmission activity (transmission/reception time) dynamically to the LTE protocol stack. By utilizing the schedule of known ISM transmission times, the WTRU may perform measurements and make reporting decisions in a more adaptive way. For example, the WTRU may determine to perform measurements during the in-device ISM scheduled gap periods or inactive periods, if it received a notification that the aggressor transmitter is not active. In this way, a non-interfered measurement may be determined during an ISM scheduled transmission period. The dynamic measurement procedure may rely on coordination between the two transmitters and scheduled/un-scheduled periods may not be configured or may not be relevant to determine the time at which measurements are taken. For example, as discussed above an un-interfered measurement may be taken at any subframe in which there is no ISM activity. An interfered measurement may be taken at any subframe in where there is ISM activity. Therefore, there may be situations where an un-interfered measurement is taken during an LTE non-scheduled period.

Figure 7:
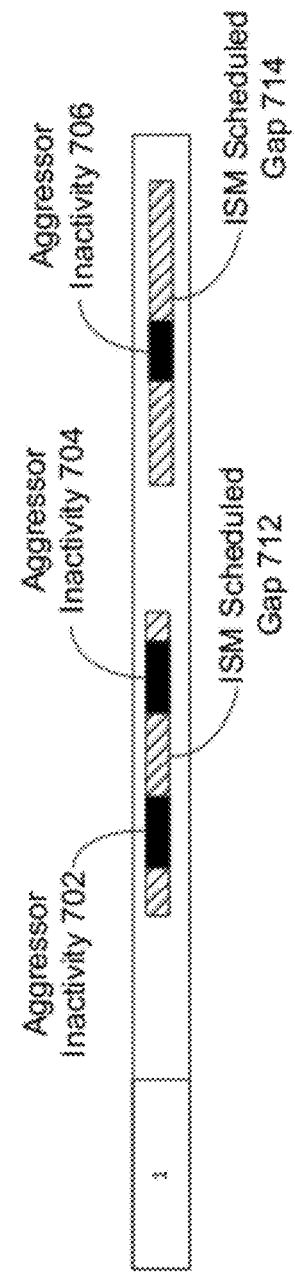
FIG. 7 illustrates an example of transmission gaps period during an in-device ISM scheduled transmission.

FIG. 7 illustrates a scenario in which the aggressor transmitter indicates to the WTRU LTE stack periods of inactivity during the ISM scheduled period. For example, the LTE network may provide a TDM scheduled including various ISM scheduled periods. For example, as shown in FIG. 7, ISM Scheduled Gap 712 and ISM Scheduled GAP 714 may be periods reserved for ISM transmitter activity. However, the IMS device may have less data to transmit in a given ISM scheduled period than may be possibly transmitted during the ISM scheduled period. For example, the ISM device, although scheduled, may have little or no data to transmit. In this scenario, the ISM device may indicate that it will be inactive for all or a subset of an ISM scheduled period. When the aggressor traffic patterns result in less than the entire allowed activity period to be utilized, the WTRU may use these inactivity periods to perform measurements of the serving cell and/or to take RLM quality samples as usual. The WTRU may also perform un-interfered CSI measurements during a period of aggressor inactivity during an ISM scheduled period.

For example, as shown in FIG. 7, Aggressor Inactivity 702 and Aggressor Inactivity 704 may be period of time during ISM Scheduled GAP 712 during which the aggressor transmitter may be inactive. Similarly, Aggressor Inactivity 706 may be a period of time during ISM Scheduled Gap 714 during which the aggressor transmitter may be inactive. The aggressor device may indicate to the LTE device that the aggressor transmitter will be inactive during Aggressor Inactivity 702, Aggressor Inactivity 704, and/or Aggressor Inactivity 706. The WTRU may be configured to perform un-interfered measurements during these aggressor inactivity periods.

In an example, the WTRU may be configured to perform measurements and report measurements (e.g., for the CQI reports and evaluation, RLM,/RRM monitoring) regardless of the periods of aggressor inactivity during non-LTE scheduled periods. For example, the eNB may expect to receive no CQI reports during the in-device ISM scheduled transmission gaps periods. If so, the WTRU may wait for an LTE scheduled period in order to perform and/or report measurements.

In an example, if the in-device ISM scheduled transmission gaps periods include periods of aggressor transmitter inactivity (e.g., the aggressor transmitter is inactive during an LTE unscheduled period), the WTRU may be configured to utilize the inactivity period to perform measurements. For example, if a CSI-RS or CRS symbols are scheduled during a period of aggressor transmitter inactivity during a non-LTE scheduled period, the WTRU may be configured to perform CSI measurements and update CSI values accordingly. The WTRU may buffer/store the measured CSI values until the next occasion for a measurement. In an example, the WTRU may be configured to deliver the measurement and/or evaluation report at the first allowed subframe and/or at the next report occasion scheduled by the eNB. For example, the report may be delivered at the next available aperiodic or periodic report opportunity. If the WTRU is able to obtain a valid measurement during a period of ISM signaled inactivity during an ISM scheduled transmission gap, the WTRU may be configured to report the measurement at the first available occasion after the end of the ISM scheduled period. If WTRU is unable to obtain a valid measurement during the aggressor inactivity periods of the non-LTE scheduled gap, the WTRU may be configured to obtain the measurements during a LTE scheduled period.

The WTRU may be configured to perform RSRQ and/or RSRP measurements during non-LTE scheduled periods if the aggressor transmitter will be inactive during the measurement opportunity. For example, the aggressor transmitter may indicate that it may inactive for a subset of subframes during a non-LTE scheduled period. The WTRU may be configured to use the inactivity occasion to evaluate RSRQ and/or RSRP.

The WTRU may signal to the LTE network a reduced or extended traffic pattern usage of the aggressor technology. For example, the WTRU may request more/fewer and/or shorter/longer ISM scheduled transmission gaps based on ISM transmission frequency. For example, if the ISM device is frequently inactive during a non-LTE scheduled period, the WTRU may request fewer non-LTE scheduled gaps or shorter non-LTE scheduled gaps. If the TDM is scheme is changed by the LTE network and/or the device, the measurements and triggering events described herein may still be applied to the new TDM pattern.

In an example, the WTRU may operate a TDM scheme without direct coordination of the pattern with the LTE network. For example, such a scheme may be implemented when the LTE network does not support eICIC operation. When described herein, such a mode of operation may be referred to as uncoordinated measurement interference mitigation. Such a scheme may be described as uncoordinated because the LTE network may not be explicitly aware of the ISM transmitter patterns. In this example, the WTRU may autonomously take into account the correlation of known transmission times by the aggressor transmitter when performing measurements. For example, the WTRU may be configured to attempt to implement TDM operation based on ISM activity periods signaled form the ISM device to the LTE device (e.g., to the LTE protocol stack). In an example, there may be some coordination in transmissions between the WTRU and the eNB, but fixed periods for ISM transmissions and LTE transmissions may be unspecified. For example, if the LTE unscheduled periods (e.g., ISM scheduled periods) granted by the LTE network are relatively short in duration, specific periods for LTE operation and ISM operation may be left undefined. If the ISM device is expected to transmit infrequently, establishing a periodic pattern of ISM operation may waste resources. In an example, WTRU may be aware of occasions when the ISM device may be transmitting, and therefore may ignore or discard certain subframes for measurement purposes, as there may be aggressor transmitter activity in these subframes. Based on the known aggressor transmitter activity, the WTRU may determine the un-interfered subframes during which measurements may be performed.

For example, if the aggressor transmitter activity is known by the LTE device, the subframe granularity may be used to schedule LTE measurements. For example, the LTE device/stack may be receive indications regarding aggressor transmitter activity for the ISM device, allowing the WTRU may avoid performing measurements during periods of known aggressor transmitter activity.

In an example, a WTRU may dynamically schedule its measurements based on knowledge of the timing of non-interfering period. In addition to knowledge of the aggressor transmitter activity schedule, the WTRU may also be configured to take into account other factors such as the number of measurement samples associated with a given measurement, a minimum distance between samples, and/or periodic reporting constraints when scheduling, performing, and/or reporting measurements. For example, the WTRU may determine a range of possible sampling times for a scheduled measurement. For instance, there may be several instances in relatively close temporal proximity to a scheduled measurement that may be utilized for performing a given measurement. The range of possible measurements instances may be determined based on a known aggressor transmitter schedule and/or other conditions for a given measurement (e.g., number of measurement samples associated with a given measurement, a minimum distance between samples, and/or periodic reporting constraints). In an example, the WTRU may be configured to perform a measurement in the first available opportunity for a measurement that falls within the range of possible measurements.

Figure 8:
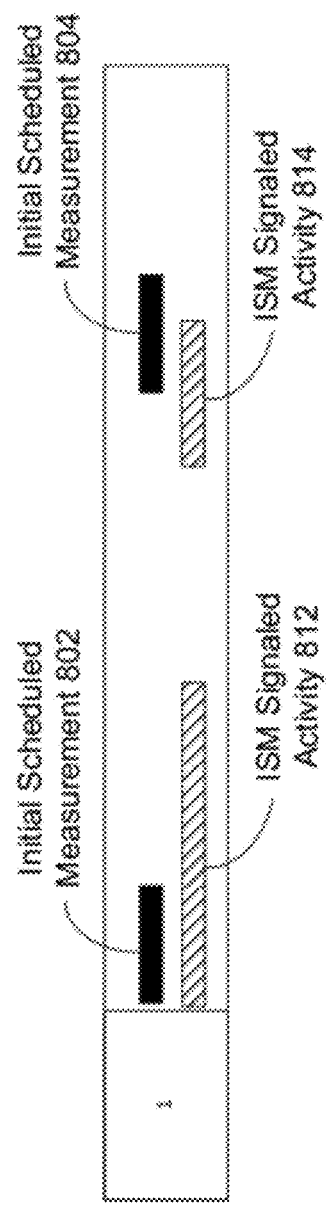
FIG. 8 illustrates an example of initially scheduled measurements and ISM aggressor signaled activity.

FIG. 8 illustrates an example of the WTRU determining a measurement time based on the aggressor transmitter activity schedule. As shown in FIG. 8, Initial Scheduled Measurement 802 and Initial Schedule Measurement 804 may be normally scheduled measurement periods (e.g., time periods scheduled for measurements absent an aggressor transmitter). ISM Signaled Activity 812 and ISM Signaled Activity 814 may be periods in which the ISM device notifies the LTE device that ISM transmissions may occur. In some scenarios, none of the initially scheduled measurement periods may be adequate for collection of the full range of measurement samples by the WTRU because of the complete or partial overlap between the measurement schedule and periods of aggressor transmitter activity. In an example, the WTRU may delay performing measurements until the aggressor completes the ISM transmission, and/or the aggressor transmitter indicates that it may be inactive. In the example shown in FIG. 8, the WTRU may determine to perform measurements in towards the end of Initial Measurement Schedule 804, once the ISM device has signaled the end of ISM Signaled Activity 814. In an example, the WTRU may be configured to implicitly determine the end of ISM Signaled Activity 814 (e.g., The WTRU may detect the end of ISM Signaled Activity 814), and perform the measurements during the end of Initial Scheduled Measurement 804, provided the portion of Initial Scheduled Measurement 804 meets the conditions for performing the measurement.

For example, a transmission token scheme may be established between the LTE transmitter and the aggressor transmitter. The logical token may be passed between the LTE transceiver and the aggressor transceiver, and the possessor of the token may be allowed to perform transmissions. The WTRU may be configured to adapt the LTE measurement schedule based on the current possessor of the token. The WTRU may adapt the measurement schedule based both the current possessor of the token, the future possessor of the token, and the other conditions associated with a given measurement. For example, such a scheme may be used to perform RLM and or RRM measurements.

For CQI measurements and/or reports, the WTRU may perform measurements based on a subframe level snapshot, which may make it difficult to perform the measurement unless the full measurement period is free of aggressor transmitter activity. Additionally, due the periodic scheduling of the CSI-RS, even if a partial measurement schedule is available, the time period when the CSI-RS were sent may have been affected by the aggressor transmitter activity. The WTRU may bridge the ISM signaled activity gaps overlapping a potential CQI and/or PMI measurement opportunity, for example by storing a previous measurement(s) until a new sample is available.

If the WTRU mobility is in a high mobility state (e.g., the WTRU is moving quickly between cells, is located near a cell boundary, is often switching between two or more cells for any reason), the WTRU may change its measurement mode, for example by adapting it to the current conditions and/or using possible triggers described herein regarding transitioning between measurement modes.

For example, triggers to transition between measurement modes may be used. The LTE network may provide the WTRU with explicit triggers and timers for WTRU in order to transition between measurement modes. A measurement mode may be a series of measurements according to specified rules. For example, in a first measurement mode the type of measurement and/or the frequency of the measurement may be different than in a second measurement mode. The LTE network may provide the WTRU a specific LTE scheduled activity pattern or several potential patterns. The WTRU may transition between the LTE schedule activity patterns based on LTE scheduled activity or inactivity timers, the value of which may be provided by the LTE network. The WTRU may be configured to adapt RLM and RRM measurements based on the changes in the LTE scheduled activity.

In an example, establishment and/or configuration/reconfiguration of a TDM pattern may trigger the WTRU to transition to a new measurement rules state. For example, a change or establishment of the TDM pattern may trigger the WTRU to apply new measurement rules. For example, the measurement pattern configured in the WTRU may correspond to one or more of the following measurement rules. In an example, the LTE network may signal an explicit in-device LTE scheduled gaps pattern. Upon reception of the pattern, the WTRU may begin to perform measurements according to the methods described herein, for example by determining potential measurement periods based on the LTE network signaled traffic pattern. The WTRU may perform measurements on the LTE RAT during the ISM device inactivity using the methods described herein.

In an example, the LTE network may signal an explicit measurement pattern for use during TDM operation. Upon reception of the explicit measurement pattern, the WTRU may begin performing measurements following the signaled pattern using the methods described herein.

In an example, the LTE network may send an indication of several LTE scheduled transmission gap patterns. The LTE network may also send values for inactivity and/or activity timers. Upon reception of the scheduled transmission patterns, the WTRU may begin monitoring an LTE control channel (e.g., Physical Downlink Control Channel (PDCCH)) according to an indicated pattern. The WTRU may perform measurements in accordance with the applied pattern as described herein. Upon beginning to monitor the LTE control channel, the WTRU may start an inactivity timer. If the LTE RAT is inactive for a specified period of time (e.g., the inactivity timer expires), the WTRU may transition to different LTE scheduled gap pattern. For example, the new pattern may provide less time for LTE operations. Upon the transition to the new activity gap pattern, the WTRU may be configured to adjust the LTE measurement schedule accordingly.

In an example, if the LTE RAT is active for a specified period of time, the WTRU may transition to a different LTE scheduled transmission gaps pattern. An LTE activity timer may be used to determine if the LTE RAT has been active for a specified period of time. For example, the timer may be started upon the successful reception of data via the LTE RAT. If the timer expires while the LTE RAT remains active, the WTRU may transition to a longer LTE monitoring time. In other words, the WTRU may transition to a new TDM pattern that devotes more time for LTE operation. The WTRU may transition the LTE measurement schedule based on the expiration of the activity timer or the transition to the new activity pattern.

In an example, the LTE network may explicitly signal an indication of a new LTE scheduled transmission gap pattern while current a LTE scheduled gap pattern is active. The new LTE scheduled transmission gap pattern may include more or less LTE scheduled activity time. Upon reception of the new LTE scheduled transmission gap pattern, the WTRU may transition to a new measurement pattern for the new LTE transmission schedule.

In an example, the WTRU may be handed over to a new cell. The new cell may be on the same frequency or a similar frequency as a previous cell, and hence may be prone to ISM device interference. The WTRU may suspend TDM operation and/or the TDM related measurements procedures based on detecting the beginning of the handover procedure. For example, TDM operation and/or the TDM related measurements procedures may be halted based on receiving a handover command from an eNB. The WTRU may be configured to resume TDM operation and/or the TDM related measurements procedures after notifying the target cell regarding the operation of the ISM device. The new cell may provide the WTRU with an indication of a TDM pattern for use in the new cell. The WTRU may also establish a new measurement pattern. The LTE network may establish the measurement pattern, or the WTRU may establish the pattern based on the know TDM pattern. The TDM pattern and/or the measurement pattern for the TDM pattern in the new cell may be the same or a different from the previous cell (e.g., the handover source cell).

In an example, the target cell for a WTRU handover may be on the same or s similar frequency as the source cell. The frequency may be prone to ISM device interference. As part of the handover command, an indication of a new TDM pattern and/or a new measurement schedule may be included in the handover command. Upon reception of the handover command including the LTE scheduled transmission gaps and successful completion of the handover, the WTRU may resume TDM operation between the LTE transmitter and the ISM transmitter. The WTRU may be configured to determine a measurement mode based on the pattern signaled in the handover command.

In an example, the WTRU may operate on a secure frequency cell (e.g., a frequency that may be less prone to aggressor interference). The WTRU may reselect to or receive a handover command from a target cell. The target cell may operate on a frequency prone to aggressor interference. For example, an ISM device may be actively transmitting and LTE operation and ISM operation may be uncorrelated on the secure frequency cell. Upon reselection or receiving a handover command to a cell on a frequency layer that is interfered from the ISM device, the WTRU may suspend the ISM device activity, send an ISM device activation event to the LTE network, and/or activate the TDM measurements mode after receiving a TDM pattern from the LTE network. In an example, the WTRU may send an indication of ISM device activity to the LTE network prior to the handover. The LTE network may embed the pattern for TDM enhanced inter-cell interference coordination (eI-CIC) measurements in the handover command. For example, the WTRU may begin the TDM mode measurements after handover completion.

In an example, the LTE network may explicitly configure the WTRU to begin applying new measurement rules. Explicit configuration may be provided by the LTE network at the same time as the TDM pattern or at a different time. The following example triggers may be used individually or in any combination. The LTE network may explicitly indicate a specific measurement mode for operation by the WTRU. The LTE network may explicitly indicate a measurement mode for a certain measurement report or event. For example, if the WTRU is configured with a TDM pattern, the LTE network may instruct the WTRU to perform intra-frequency measurements using normal procedures. In this way the LTE network may be made aware of quality of the frequency during multiple aggressor transmitter and LTE operation. The LTE network may determine to instruct the WTRU to begin measuring during the LTE scheduled gaps/periods or un-interfered subframes at any time. For example, the network may determine that the measurements are being biased by ISM operation and may instruct the WTRU to begin taking un-interfered measurements I order to prevent adverse measurements events from being triggered (e.g., declaring radio link failure).

In an example, the LTE network may explicitly indicate that the WTRU should begin performing certain measurements according to measurement pattern, while performing other measurements normally. For example, the LTE network may explicitly indicate a change in the method/mode for performing RSRQ/RSRP measurements, while indicting that CQI, PMI, RLM, and/or RRM measurements should be unaffected. In an example, the LTE network may indicate a subset of measurements to that are be performed according to a measurement pattern, while other measurement may still be performed using a normal schedule. The subset may include one or more of RSRQ measurements, RSRP measurements, CQI measurements, PMI measurements, RLM measurement, or RRM measurements. The LTE network may also indicate when to start performing one or more of the subset of measurements.

In an example, the LTE network may provide a measurement pattern and additionally configure a measurement timer. The WTRU may perform and report normal measurements until the measurement timer expires. Upon expiration of the measurement timer, the WTRU may begin performing measurements according to one or more of the rules described herein. In an example, if no timer is specified, the WTRU may perform measurements according to normal rules. If the timer is configured by the network to have a value of zero, the WTRU may begin new measurement rules upon reception of the TDM pattern.

In an example, the LTE network may dynamically change the measurement mode using L2 and/or L1 signaling. For example, a MAC control element may be used to explicitly indicate to the WTRU to start using the new measurement mode or to revert to normal measurement mode. In an example, a physical downlink control channel (PDCCH) order may be used to establish and/or change a measurement mode/pattern. MAC CE and/or the PDCCH order may explicitly indicate to which measurement(s) the WTRU may apply the new rule to.

In an example, the indication of measurement mode may be provided or configured in the WTRU as part of the measurement configuration message, as part of the TDM pattern provided to the WTRU, and/or by means of radio resource control (RRC) reconfiguration message Additionally, triggers may be defined for exiting the in-device TDM specific measurements mode. The exit triggers may include one or more the following events. For example, deactivation of the ISM device may trigger the WTRU to autonomously exit the TDM related measurement procedures. Upon exiting the TDM related measurement procedures, the WTRU may resume normal measurement operations.

In an example, upon deactivation of the ISM device, the WTRU may signal the ISM deactivation to the LTE network. The WTRU may receive an acknowledgement from the LTE network of the deactivation of the ISM device. The acknowledgement may serve as a trigger for exiting a measurement mode. After receiving the acknowledgement, the WTRU may de-activate the TDM related procedures and resume the normal measurement operation.

In an example, the WTRU may reselect to a new cell on a frequency that may be less prone to ISM device interference (e.g., a secure frequency). The reselection to a secure frequency may trigger the WTRU to exit TDM operation and or the TD measurement mode. Upon successful reselection to a cell on a secure frequency, the WTRU may autonomously deactivate the TDM related measurements mode and resume normal measurement operations. The WTRU may begin uncoordinated mode operation for the ISM device.

In an example, the WTRU may perform a handover to a target cell on a secure frequency (interference free from ISM device) or another RAT on a secure frequency. Upon a successful handover to a target cell on the same RAT or a different RAT both considered secure from the ISM caused interference point of view, the WTRU may autonomously stop the TDM related measurement procedures and resume normal measurements procedure for that specific RAT and cell.

In an example, the LTE network may perform a handover. The new cell may be on the same frequency, which may be prone to ISM device interference. In this example, the in-device TDM pattern may be omitted from the handover command. The reselection from a cell with a frequency prone to ISM interference to a new cell also prone to ISM interference may be a trigger to exiting TDM and/or a TDM related measurement mode. The WTRU may suspend the in-device TDM mode measurements after the successful handover. If the target cell does not support an eICIC TDM scheme, the WTRU may allow ISM device activity and use the methods for uncoordinated measurement interference mitigation. In an example, the WTRU may completely stop the ISM device activity and follow the normal measurements procedures under the governance of the cell. In an example, the LTE network may send an explicit indication to remove a configuration of a TDM pattern to the WTRU.

In an example, the LTE network may explicitly indicate to the WTRU to stop performing measurements according to the TDM pattern, even if the ISM device is still active and a TDM pattern is still configured in the WTRU.

In an example, independent measurements may be triggers to enter or exit a TDM measurement mode. The LTE network may provide separate/dedicated triggers for different types of measurements. For example, the RRM measurements may be performed normally, while the CQI and/or RLM measurements may be restricted to LTE scheduled transmission gaps. In an example, upon ISM device activation, the WTRU may receive a measurement pattern applicable for CQI while other RRM measurements may be performed according to the normal pattern. In an example, upon ISM device activation, the WTRU may receive different measurement patterns for CQI, RLM and/or RRM related measurements. In an example, if the WTRU has a specific pattern for CQI measurements while the ISM device is active, and the ISM device changes its traffic pattern, the WTRU may be triggered to alter one or more measurement patterns. For example, the WTRU may notify the LTE network of the change in ISM traffic, and in response the WTRU may receive a dedicated pattern for RRM measurements and/or RLM measurements. Additionally, the existing CQI pattern may be updated. In an example, if the ISM traffic pattern changes, the WTRU may autonomously activate TDM mode measurements (e.g., RLM and/or RRM measurements) based on one or more measurement thresholds and/or measurement timers. In an example, a WTRU may transition to a previously received pattern for RLM, RRM and/or CQI based on an ISM device traffic pattern change.

The triggers and measurements described herein may be used individually or in any combination for the different measurement types. More specifically, different rules and triggers may be applicable for the different measurement types. For example, in one combination implementation, upon reception of any of the patterns the WTRU may start applying the TDM measurement rules for CQI reporting. The LTE network may then explicitly configure the WTRU to change measurement modes for RSRQ/RSRP and/or RLM. In an example, the WTRU may apply the CQI measurements and RLM according to the TDM pattern upon configuration and wait for an explicit order for the RSRQ/RSRP. In an example, the rules described may trigger measurements to change mode of operation.

Non-explicit triggers and timers signaled by the LTE network may be used. When the LTE network does not support eICIC operation, the WTRU may use described methods herein regarding uncoordinated measurement interference mitigation in order to allow the ISM device operation.

Exemplary triggers to enter uncoordinated measurement interference mitigation may be one or more of the following, in any combination. For example, WTRU operation on a cell on a frequency that is interference prone may be a trigger to enter uncoordinated measurement interference mitigation. In an example, a WTRU receiving a handover command that instructs the WTRU to handover to an interference prone target cell may be a trigger to begin uncoordinated measurement interference mitigation. In an example, a handover from a non-interference prone cell to an interference prone cell (e.g., inter-frequency handover) may be a trigger to enter uncoordinated measurement interference mitigation, for example if the ISM device is in or enters operation.

Exemplary triggers to exit uncoordinated measurement interference mitigation may be one or more of the following, in any combination: For example, ISM device de-activation may be a trigger to exit uncoordinated measurement interference mitigation. In an example, a WTRU may be operating in a TDM measurement mode (e.g., the ISM device is active) and may receive a handover command instructing the WTRU to handover to a target cell that is on a frequency that is less prone to interference from the ISM device. Such a handover command may be a trigger to exit uncoordinated measurement interference mitigation. In an example, the WTRU may be operating in a TDM measurement mode (e.g., the ISM device is active) and may be receive a handover command instructing the WTRU to handover to a target cell that may be on a frequency prone to interference from the ISM device. The target cell may support the eICIC operation. If so, receiving a handover command instructing the WTRU to reselect to a cell that may be interference prone but that also supports eICIC operation may be a trigger to exit uncoordinated measurement interference mitigation. Upon reselection or receiving a handover command to a cell on a frequency prone to interference from the ISM device, the WTRU may suspend the ISM device activity, send an ISM device activity event, and/or may activate the TDM measurements mode after receiving the pattern from the LTE network.

In an example, the WTRU may perform inter-frequency measurements or inter-RAT measurements of an interference prone frequency. The WTRU may be operating in a frequency that is not prone to interference due to the aggressor transmitter. The LTE network may send a measurement configuration message instructing the WTRU to perform measurements and/or transmission/reception on a frequency that may be prone to interference with a coexisting, aggressor transmitter. For example, if the WTRU is configured to perform inter-frequency or inter-RAT measurements on a certain frequency that may be prone to aggressor interference, and the WTRU is aware that a coexisting radio access technology (e.g., an ISM device) is active on that frequency, the WTRU may report existence of the in-device aggressor transmitter to the LTE network. The WTRU may indicate the frequency in which interference exists or indicate that interference exist in the frequency configured for measurements. The WTRU may trigger an in-device interference report indicating that a coexisting technology is active on the frequency. This report may also be sent to the LTE network. In an example, the WTRU may send an in-device interference report to the LTE network in which the WTRU reports the interfered frequencies prior to receiving a measurement configuration. The purpose of the report may be to make the LTE network aware of potential in-device interference on the designated frequencies.

In response to the in-device interference report, the LTE network may provide the WTRU with a TDM pattern and/or with a measurement pattern set and/or indicate to the WTRU to take measurements on interfered or un-interfered subframes on that frequency. The pattern may be a different pattern than what the LTE network would provide to the WTRU in order for the WTRU to operate in a TDM scheme while LTE is active on that frequency. The pattern may be configured such that the aggressor transmitter may perform transmissions freely with the exception at certain time instances, during which the WTRU may perform inter-frequency measurements on that frequency. The LTE capable WTRU may provide this pattern to the ISM device, such that it may temporarily stop transmission during the specified subframes to allow the WTRU to take the measurements.

In an example, a TDM pattern and/or a measurement pattern may be provided to the WTRU as if the LTE radio is operating on the potentially interfered frequency. The WTRU may provide this pattern to the aggressor transmitter in order to ensure that the aggressor transmitter is not transmitting during periods during which the WTRU attempts to perform RSRQ/RSRP measurements. In an example, the WTRU may continue to perform CQI reporting and RLM may continue to be performed in a normal mode of operation since the operating LTE frequency may be less prone to interference. However, if the LTE operating frequency is prone to interference, the mitigation and measurement techniques described herein may be applied. A WTRU may include a processor that communicates with different radio technologies (e.g., LTE and Bluetooth). The processor may exchange information local to each of the radio technologies in order to facilitate dual operation. The WTRU may also communicate externally via one or more wireless communication methods to determine the signaling patterns and the relevant intervals during which the measurements may be performed.

In an example, rather than (or in addition to) the LTE network providing specific TDM patterns, the LTE network may provide the WTRU the times associated measurement gaps. For example, the LTE network may utilize normal measurements timing (e.g., the measurements should be performed as if there was no aggressor transmitter). However, the WTRU may be configured to prevent the aggressor transmitter from transmitting during the measurement gaps, such that the WTRU may properly perform measurements on that frequency/RAT without interference. For example, the WTRU may specify certain periods or subframes during which the aggressor may be denied from utilizing for transmissions, but transmissions outside of the measurements may be uncoordinated (e.g., the LTE device does not know the transmission schedule of the aggressor outside of the measurement window). An explicit indication may be provided to the WTRU to indicate that the aggressor should be inactive during the measurement gaps.

The LTE network may explicitly indicate to the WTRU the types of measurements to perform. For example, the LTE network may instruct the WTRU to perform measurements during normal aggressor activity (e.g., the aggressor device operates normally, which may or may not interfere with a performed measurement). The LTE network may instruct the WTRU to perform measurements during clean or un-clean subframes during which the aggressor may be silent. The LTE network may indicate the type of message in a measurement configuration message and/or using an RRM message.

In an example, if the WTRU determines measurements are to be taken during un-interfered subframes, it may determine the subframes during which no aggressor activity may be taking place in order to take measurements on one or more frequencies. For example, during a measurement gap, if the aggressor is transmitting, the WTRU may disregard a performed measurement. In an example, the WTRU may delay a measurement until it determines that an un-interfered subframe will occur during the measurement gap.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed:

1. A Wireless Transmit/Receive Unit (WTRU) comprising:
   at least one antenna;
   a first transceiver configured to receive perform at a first frequency via the at least one antenna;
   a second transceiver configured to transmit at a second frequency; and
   a processor configured to perform measurements based on signals received via the first transceiver, determine an existence of interference between the first transceiver and the second transceiver, and autonomously determine timing of the measurements to be performed based on transmissions of the second transceiver.

2. The WTRU of claim 1, wherein the processor is configured to send a message to a long term evolution (LTE) network, the message informing the LTE network of the existence of activity by the second transceiver.

3. The WTRU of claim 2, wherein the processor is further configured to, after autonomously determining the timing of measurements, receive a time division multiplexing (TDM) pattern from the LTE network via the first transceiver, wherein the TDM pattern establishes periods of time for operation by the first transceiver and periods of time for operation of the second transceiver.

4. The WTRU of claim 3, wherein the processor is configured to determine the timing of the measurements during the periods of time for operation by the first transceiver according to the TDM pattern received from the LTE network.

5. The WTRU of claim 3, wherein the processor is configured to determine that a first time for at least one measurement occurs during the periods of time for operation by the second transceiver according to the TDM pattern received from the LTE network, wherein the second transceiver is configured to indicate to the processor that the second transceiver will be inactive during the first time.

6. The WTRU of claim 1, wherein the processor is configured to change the timing of the measurements based on an indication received from a long term evolution (LTE) network.

7. The WTRU of claim 6, wherein the indication is a discontinuous reception (DRX) indication.

8. The WTRU of claim 1, wherein the processor is further configured to adjust at least one of a timing of or a frequency of a channel quality index (CQI) report based on the transmissions of the second transceiver.

9. A method performed by a Wireless Transmit/Receive Unit (WTRU), the method comprising:
  receiving signals at a first frequency via a first transceiver via at least one antenna;
  transmitting on a second frequency via a second transceiver;
  performing measurements based on the signals received via the first transceiver;
  determining an existence of interference between the first transceiver and the second transceiver; and
  autonomously determining timing of the measurements to be performed based on transmissions of the second transceiver.

10. The method claim 9, further comprising:
  sending a message to a long term evolution (LTE) network, the message informing the LTE network of the existence of activity by the second transceiver.

11. The method claim 10, further comprising:
  receiving, after autonomously determining the timing of the measurements, a time division multiplexing (TDM) pattern from the LTE network via the first transceiver, wherein the TDM pattern establishes periods of time for operation by the first transceiver and periods of time for operation of the second transceiver.

12. The method claim 11, further comprising:
  determining the timing of the measurements during the periods of time for operation by the first transceiver according to the TDM pattern received from the LTE network.

13. The method claim 11, further comprising:
  determining that a first time for at least one measurement occurs during the periods of time for operation by the second transceiver according to the TDM pattern received from the LTE network; and
  indicating that the second transceiver will be inactive during the first time.

14. The method claim 9, further comprising:
  changing the timing of the measurements based on an indication received from a long term evolution (LTE) network.

15. The method claim 14, wherein the indication is a discontinuous reception (DRX) indication.

16. The method claim 9, further comprising:
  adjusting at least one of a timing of or a frequency of a channel quality index (CQI) report based on the transmissions of the second transceiver.

* * * * *

UNITED STATES PATENT AND TRADEMARK OFFICE
CERTIFICATE OF CORRECTION

PATENT NO. : 9,591,499 B2
APPLICATION NO. : 13/289984
DATED : March 7, 2017
INVENTOR(S) : Virgil Comsa, Diana Pani and Paul Marinier Page 1 of 1

It is certified that error appears in the above-identified patent and that said Letters Patent is hereby corrected as shown below:

In the Claims

Column 34, Line 60, Claim 1: delete "perform"

Signed and Sealed this
Twenty-seventh Day of March, 2018

Andrei Iancu
*Director of the United States Patent and Trademark Office*